US012551700B2

(12) United States Patent
Sunkeri et al.

(10) Patent No.: US 12,551,700 B2
(45) Date of Patent: Feb. 17, 2026

(54) ADJUSTABLE AURICULAR NERVE STIMULATION DEVICES, AND ASSOCIATED SYSTEMS AND METHODS

(71) Applicant: NextSense, Inc., Mountain View, CA (US)

(72) Inventors: Pankaj Sunkeri, Belmont, CA (US); Vivek K. Sharma, San Ramon, CA (US); John Michael Elam, Thousand Oaks, CA (US); John Vernon, Thousand Oaks, CA (US); Ravi Sawhney, Thousand Oaks, CA (US); Lance Hussey, Thousand Oaks, CA (US); Eric Chan, New York, NY (US); Lemeng Shao, New York, NY (US)

(73) Assignee: NEXTSENSE, INC., Mountain View, CA (US)

( * ) Notice: Subject to any disclaimer, the term of this patent is extended or adjusted under 35 U.S.C. 154(b) by 448 days.

(21) Appl. No.: 18/151,778

(22) Filed: Jan. 9, 2023

(65) Prior Publication Data

US 2023/0233855 A1 Jul. 27, 2023

Related U.S. Application Data

(60) Provisional application No. 63/297,524, filed on Jan. 7, 2022.

(51) Int. Cl.
*A61N 1/36* (2006.01)
*A61N 1/04* (2006.01)
*H04R 1/10* (2006.01)

(52) U.S. Cl.
CPC ....... *A61N 1/36036* (2017.08); *A61N 1/0472* (2013.01); *H04R 1/1016* (2013.01); *H04R 1/105* (2013.01); *H04R 1/1066* (2013.01)

(58) Field of Classification Search
CPC ............... A61N 1/0456; A61N 1/0472; A61N 1/36036; H04R 1/1016; H04R 1/105; H04R 1/1066; H04R 25/554; H04R 25/607

See application file for complete search history.

(56) References Cited

U.S. PATENT DOCUMENTS

| 9,782,584 | B2 * | 10/2017 | Cartledge | A61N 1/0472 |
|---|---|---|---|---|
| 2015/0165195 | A1 | 6/2015 | Hartlep et al. | |
| 2020/0197707 | A1 * | 6/2020 | Covalin | A61N 1/0456 |
| 2021/0252279 | A1 * | 8/2021 | Kong | A61M 21/00 |

OTHER PUBLICATIONS

International Search Report mailed Jul. 18, 2023 in International Application No. PCT/US2023/60311.

* cited by examiner

*Primary Examiner* — Amanda K Hulbert
(74) *Attorney, Agent, or Firm* — Jason A. Smith; Shumaker, Loop & Kendrick, LLP

(57) ABSTRACT

Adjustable auricular nerve stimulation devices, and associated systems and methods, are disclosed herein. A representative device for delivering an electrical signal to a subject includes a signal delivery element including at least two electrodes configured to deliver the electrical signal to a first portion of the subject's ear. The device also includes a retention element configured to engage a second portion of the subject's ear. The device further includes an adjustment mechanism permitting movement of the signal delivery element relative to the retention element to place the at least two electrodes in contact with the first portion of the subject's ear.

18 Claims, 12 Drawing Sheets

ADJUSTABLE AURICULAR NERVE STIMULATION DEVICES, AND ASSOCIATED SYSTEMS AND METHODS

CROSS-REFERENCE TO RELATED APPLICATION(S)

This application claims priority to U.S. Provisional Application No. 63/297,524 filed on Jan. 7, 2022, the disclosure of which is hereby incorporated by reference herein in its entirety.

TECHNICAL FIELD

The present technology is directed generally to devices for auricular nerve stimulation, and associated systems and methods.

BACKGROUND

Electrical energy application ("electrical stimulation") to nerves or other neural tissue for the treatment of medical conditions has been used for many decades. Cardiac pacemakers are one of the earliest and most widespread examples of electrical stimulation to treat medical conditions, with wearable pacemakers dating from the late 1950s and early 1960s. In addition, electrical stimulation has been applied to the spinal cord and peripheral nerves, including the vagal nerve. More specifically, electrical stimulation has been applied transcutaneously to the vagal nerves to address various patient indications. While such stimulation has provided successful patient outcomes in at least some instances, there remains a need for improved systems for delivering transcutaneous vagus nerve stimulation that are compact, light, comfortable for the patient, without stimulation-induced perceptions, consistently positionable in the same location, and able to consistently deliver electrical current over a relatively wide area to accommodate anatomical differences.

DETAILED DESCRIPTION

Figure 1:
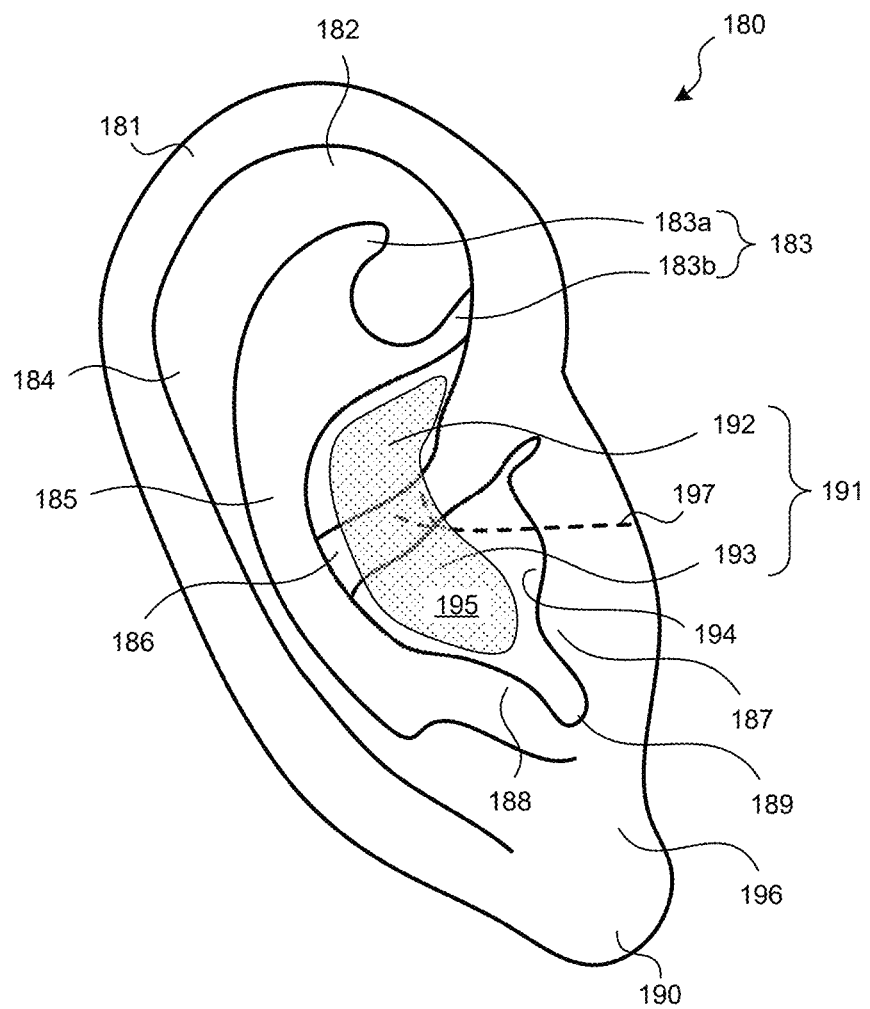
FIG. 1 is a partially schematic side view of a human ear, illustrating a representative target region for stimulation in accordance with embodiments of the present technology.

General aspects of the anatomical and physiological environment in which the disclosed technology operates are described under Heading 1.0 ("Introduction") below. Definitions of selected terms are provided under Heading 2.0 ("Definitions"). Representative systems and devices and their characteristics are described under Heading 3.0 ("Representative Systems and Devices"). Representative signal delivery parameters are described under Heading 4.0, representative indications and effects are described under Heading 5.0, representative pharmacological supplements are described under Heading 6.0, and further representative embodiments are described under Heading 7.0.

1.0 Introduction

The present technology is directed generally to devices for auricular nerve stimulation, and associated systems and methods. In some embodiments, a device for delivering electrical signals to a subject includes a signal delivery element having at least two electrodes configured to deliver the electrical signal to a first portion of the subject's ear (e.g., to the cymba concha). The device can also include a retention element configured to engage a second portion of the subject's ear (e.g., the ear canal, the posterior portion of the ear, or other suitable portion) to secure the device to the ear. The device can further include an adjustment mechanism permitting movement of the signal delivery element relative to the retention element to place the at least two electrodes in contact with the first portion of the subject's ear. For example, the adjustment mechanism can be a spring mechanism that biases the electrodes into contact with the first portion of the ear. As another example, the adjustment mechanism can include one or more magnetic elements that interact with each other to hold the electrodes at the first portion of the ear. Accordingly, the devices described herein can be easily and quickly adjusted to accommodate the particular subject's ear anatomy, and are expected to enhance patient comfort and improve skin-electrode contact for signal delivery.

2.0 Definitions

Unless otherwise stated, the terms "about" and "approximately" refer to values within 20% of a stated value.

As used herein, and unless otherwise noted, the terms "modulate," "modulation," "stimulate," and "stimulation" refer generally to signals that have an inhibitory, excitatory, and/or other effect on a target neural population. Accordingly, a "stimulator," "electrical stimulation" and "electrical signals" can have any of the foregoing effects on certain neural populations, via electrical communication (e.g., interaction) with the target neural population(s).

As used herein, the term "auricular nerve" includes the auricular branch of the vagal nerve (sometimes referred to as Arnold's nerve or aVN), as well as other auricular nerves, for example, the greater auricular nerve, and/or the trigeminal nerve.

The term "therapeutically-effective amount," as used herein, refers to the amount of a biologically active agent and/or electrical input (e.g., power, current, charge, and/or other suitable measure) needed to initiate and/or maintain the desired beneficial result. The amount of the biologically active agent and/or electrical input employed will be that amount necessary to achieve the desired result. For a biologically active agent, this may vary widely depending upon the particular biologically active agent being delivered, the site of delivery, and the dissolution and release kinetics for delivery of the biologically active agent (including whether the agent is delivered topically, orally, and/or in another manner), and the patient's individual response to dosing. For an electrical input, signal delivery parameters (e.g., amplitude, frequency, pulse width, inter-pulse spacing, pulse shape, therapy session duration and/or repetition rate, and/or other factors) may also be selected based on an individual's response and/or expected response.

The term "paresthesia" refers generally to an induced sensation of numbness, tingling, prickling ("pins and needles"), burning, skin crawling, and/or itchiness.

Several aspects of the technology are embodied in computing devices, e.g., programmed/programmable pulse generators, controllers and/or other devices. The computing devices on/in which the described technology can be implemented can include one or more central processing units, memory, input devices (e.g., input ports), output devices (e.g., display devices), storage devices, and network devices (e.g., network interfaces). The memory and storage devices are computer-readable media that can store instructions that implement the technology. In some embodiments, the computer-(or machine-) readable media are tangible media. In some embodiments, the data structures and message structures can be stored or transmitted via an intangible data transmission medium, such as a signal on a communications link. Various suitable communications links can be used, including but not limited to a local area network and/or a wide-area network.

Although certain embodiments herein are described in terms of a "patient," "treatment," or "therapy," this is not intended to be limiting, and one of skill in the art will appreciate that the present technology can be applied to subjects or persons who do not have and/or are not at risk of developing a particular disease, disorder, or condition. Additionally, the present technology also includes embodiments in which stimulation is applied to a subject having, and/or at risk of developing, a disease, disorder, or condition, but the stimulation is not intended to treat and/or prevent the disease, disorder, or condition, and is instead being applied for the purpose of inducing other effects in the subject (e.g., to improve wellness, enhance functioning).

3.0 Representative Systems and Devices

Representative systems and devices in accordance with the present technology deliver electrical signals transcutaneously to the auricular branch(es) of a patient's vagus nerve. The signals are delivered via electrodes positioned at or partially within one or both of the patient's ears. FIG. 1 illustrates the general physiology of the external portion of a human ear 180, indicating a representative target region 195 at which the electrical signals are applied. The external ear 180 includes the helix 181 partially encircling the triangular fossa 182 and the scaphoid fossa 184, and terminating at the lobule or lobe 190. Within the helix 181 is positioned the antihelix 185, the antihelix crura 183 (including the superior crus 183a and inferior crus 183b), the antitragus 188, and the intertragic notch 189. The concha 191 is positioned inwardly from the antihelix 185, and includes the cymba concha 192 and cavum concha 193, bounded by the tragus 187 and separated from the cymba concha 192 by the helix crus 186. The skin 196 of the external ear 180 extends into the external ear canal 194, which terminates at the ear drum (not visible in FIG. 1). The auricular branch of the vagus nerve 197 innervates the ear 180, and the target region 195 is generally over and/or adjacent the auricular branch 197.

As shown in FIG. 1, the target region 195 is positioned primarily at the concha 191 and can extend at least partially into the ear canal 194. Devices configured in accordance with embodiments of the present technology are configured not only to deliver electrical therapy signals to the target region 195, but to provide comfortable, repeatable, and in at least some embodiments, patient-specific, structures and therapy signals for doing so.

Figure 2A:
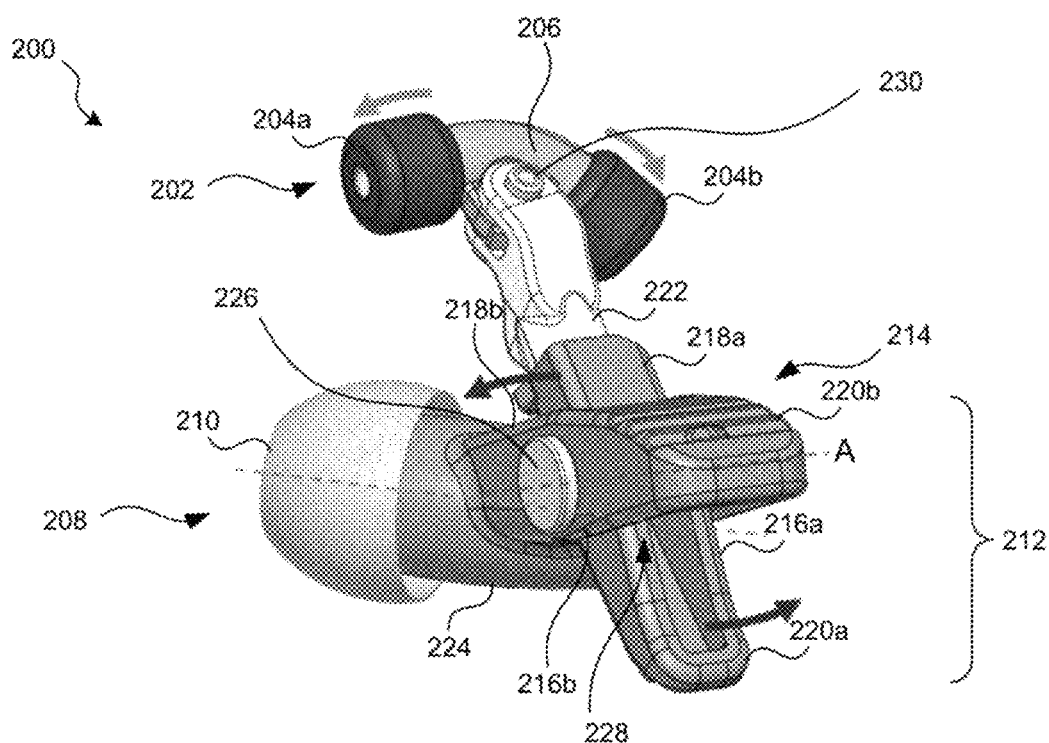
FIGS. 2A and 2B illustrate a representative earpiece configured in accordance with embodiments of the present technology.
Figure 2B:
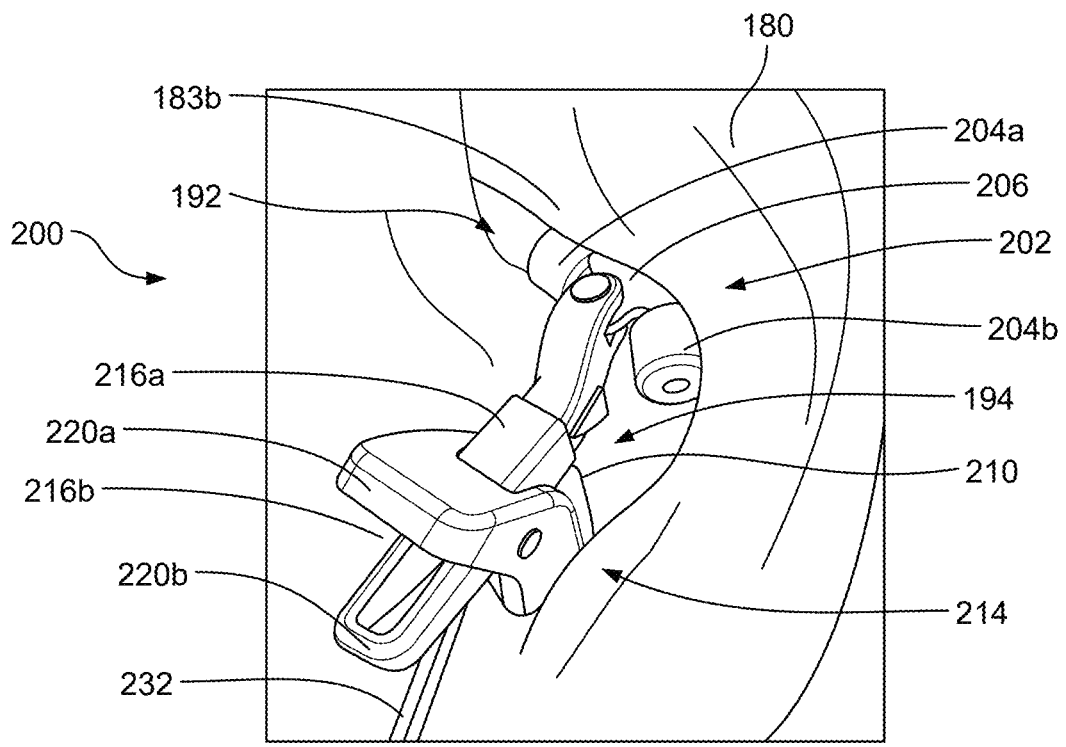

FIGS. 2A and 2B illustrate a representative earpiece 200 configured in accordance with embodiments of the present technology. More specifically, FIG. 2A is a perspective view of the earpiece 200 by itself and FIG. 2B is a perspective view of the earpiece 200 positioned in a subject's ear 180. Referring first to FIG. 2A, the earpiece 200 includes a signal delivery element 202 carrying at least two electrodes 204a-b (collectively, electrodes 204). The electrodes 204 can be transcutaneous electrodes made of a conductive material suitable for delivering electrical signals to the subject's auricular nerve. For example, the electrodes 204 can be made of a conductive silicone (e.g., silicone impregnated with one or more conductive materials), another conductive polymer, and/or metal (e.g., copper). In the illustrated embodiment, the electrodes 204 each have a rounded, generally cylindrical shape. In other embodiments, however, the electrodes 204 can have different shapes (e.g., spherical, ellipsoidal). The size of the electrodes 204 can be varied as desired to provide a snug fit with a target region of the ear (e.g., the cymba concha, as described in greater detail below). For example, the electrodes 204 can have a diameter within a range from 0.5 cm to 1.5 cm, and/or a length within a range from 0.5 cm to 1.5 cm.

In the illustrated embodiment, the signal delivery element 202 includes an elongate support member 206, and the electrodes 204 are positioned at opposite end portions of the elongate support member 206. In other embodiments, the electrodes 204 can be positioned differently, e.g., spaced apart from the end portions of the elongate support member 206, at or near the central portion of the elongate support member 206, or any other suitable location. Additionally, although the elongate support member 206 is depicted as having a curved shape (e.g., to conform to the ear anatomy), in other embodiments, the elongate support member 206 can have a linear shape or any other suitable shape. The elongate support member 206 can have any suitable length, such as a length within a range from 1 cm to 3 cm (e.g., 1.25 cm, 1.5 cm, 1.75 cm, 2 cm, 2.25 cm, 2.5 cm, or 2.75 cm). The spacing between the electrodes 204 can be at least 0.5 cm, 0.75 cm, 1 cm, 1.25 cm, or 1.5 cm.

The earpiece 200 further includes a retention element 208 for securing the earpiece 200 to a portion of the subject's ear. For example, the retention element 208 can be or include an earbud 210 configured to engage the subject's ear (e.g., the ear canal, as described in greater detail below). The retention element 208 can be used as a guide or reference for aligning the signal delivery element 202 with the target region of the ear. For example, the retention element 208 can be positioned relative to the signal delivery element 202 such that, when the retention element 208 is engaged with the ear, the signal delivery element 202 is located at or near the target region of the ear. Optionally, the earpiece 200 can deliver an audio signal and/or another feedback signal (e.g., haptic feedback) to the subject, e.g., via the earbud 210.

The earpiece 200 includes an adjustment mechanism 212 permitting the signal delivery element 202 and the retention element 208 to move relative to one another, for example, so the electrodes 204 of the signal delivery element 202 can be placed in contact with a target region of the subject's ear. The adjustment mechanism 212 can permit movement of the signal delivery element 202 relative to the retention element 208 (e.g., up to three degrees of translational freedom and/or up to three degrees of rotational freedom) to accommodate different ear shapes and/or sizes. Additionally, the adjustment mechanism 212 can bias the signal delivery element 202 into engagement with the target region of the ear so the electrodes 204 maintain sufficient surface contact with the ear for transdermal signal delivery. For example, the fit between the electrodes 204 and the ear can produce a skin-electrode impedance less than or equal to 30,000 Ohms, 25,000 Ohms, 20,000 Ohms, 15,000 Ohms, 10,000 Ohms, or 5,000 Ohms. The fit between the signal delivery element 202 and the ear can produce an electrode-to-skin contact area in a range of from 20% to 100% of the exposed electrode surface area. This intimate contact can reduce the likelihood for generating paresthesia, at least because the electrode-to-skin contact area can reduce the energy is required to be delivered to the electrodes 204.

In the illustrated embodiment, the adjustment mechanism 212 is or includes a spring mechanism 214 (e.g., a spring clip or lever) coupled to the signal delivery element 202 and the retention element 208. The spring mechanism 214 can include a first arm member 216a connected to the signal delivery element 202 and a second arm member 216b connected to the retention element 208. The first arm member 216a can include a first distal end portion 218a coupled to the signal delivery element 202, and a first proximal end portion 220a opposite the first distal end portion 218a. In the illustrated embodiment, for example, the first distal end portion 218a is connected to a linkage member 222 which in turn connects to the elongate support member 206. The second arm member 216b can include a second distal end portion 218b coupled to the retention element 208, and a second proximal end portion 220b opposite the second distal end portion 218b. For example, the second distal end portion 218b can be connected to an earbud support 224, and the earbud 210 can be mounted on the earbud support 224. In some embodiments, one or both of the first and second proximal end portions 220a-b can include ridges, texturing, and/or other elements to facilitate gripping, e.g., when positioning the earpiece 200 in the subject's ear and/or adjusting the earpiece 200, as discussed in greater detail below.

The first and second arm members 216a-b can be rotatably coupled to each other at a pivot joint 226. The pivot joint 226 can be located between the respective distal end portions 218a-b and proximal end portions 220a-b of the first and second arm members 216a-b. In the illustrated embodiment, the second arm member 216b includes a slot or aperture 228 formed therein, and the first arm member 216a is positioned at least partially within the aperture 228 and pivots relative to the second arm member 216b. In other embodiments, however, the first and second arm members 216a-b can be arranged differently (e.g., the second arm member 216b can be received within an aperture formed in the first arm member 216a, or the first and second arm members 216a-b can be positioned side by side). The first and second arm members 216a-b can rotate relative to each other around an axis A at the pivot joint 226 so the distance between the first distal end portion 218a and second distal end portion 218b is adjustable. Accordingly, the distance or separation between the signal delivery element 202 and retention element 208 can be changed to conform to the size of the subject's ear. For example, the distance can be adjusted to any distance within a range from 0.5 cm to 3 cm, such as 0.75 cm, 1 cm, 1.25 cm, 1.5 cm, 1.75 cm, 2 cm, 2.25 cm, 2.5 cm or 2.75 cm.

In some embodiments, the first and second arm members 216a-b are spring-loaded (e.g., via a spring element at or near the pivot joint 226) so that the first distal end portion 218a is biased upward and/or away from the second distal end portion 218b. The spring force can bias the signal delivery element 202 away from the retention element 208 and against the target region of the ear. As a result, the electrodes 204 can be placed in contact with the target region of the ear to deliver transdermal electrical signals to the auricular nerve. The spring force can be sufficiently large to maintain the positioning of the electrodes 204 and prevent them from being inadvertently dislodged (e.g., during normal activity such as walking, turning of the head, or other movements). Representative spring forces are under 10 Newtons, and in particular embodiments, under 2 Newtons.

In some embodiments, the earpiece 200 includes other adjustable elements to accommodate the subject's particular ear anatomy. For example, the device can include a second pivot joint 230 rotatably coupling the linkage member 222 to the elongate support member 206. The second pivot joint 230 can allow the elongate support member 206 to rotate relative to the linkage member 222 with respect to one, two, or three degrees of rotational freedom. The axes of rotation of the linkage member 222 and the second pivot joint can be perpendicular or otherwise non-parallel to one another (e.g., 75°, 60°, 45°, 30°, 15°, etc.). Additionally or alternatively, the axes of rotation of the linkage member 222 and the pivot joint 226 can be perpendicular or otherwise non-parallel to one another (e.g., 75°, 60°, 45°, 30°, 15°, etc.). Thus, the signal delivery element 202 can be pivoted relative to the linkage member 222 to conform to the particular angle of the target region. Alternatively or in combination, the earpiece 200 can be configured for any of the following adjustments: translation and/or rotation of the electrodes 204 relative to the elongate support member 206; bending of the elongate support member 206; translation of the elongate support member 206 relative to the linkage member 222; translation and/or rotation of the linkage member 222 relative to the first arm member 216a; translation of the first arm member 216a relative to the second arm member 216b; rotation of the first arm member 216ba relative to the second arm member 216b with respect to additional degrees of rotational freedom; translation and/or rotation of the earbud support 224 relative to the second arm member 216b; and/or translation and/or rotation of the earbud 210 relative to the earbud support 224.

Referring next to FIG. 2B, to position the earpiece 200 in the subject's ear 180, the subject (or another an individual) can grip the earpiece 200 via the respective proximal end portions 220a-b of the first and second arm members 216a-b, and insert the earbud 210 into the opening of the ear canal 194. Optionally, the subject can squeeze the proximal end portions 220a-b toward each other to move the signal delivery element 202 toward the earbud 210 to reduce the vertical extent of the earpiece 200, which can make it easier to position the earpiece 200 in the ear 180. Once the earbud 210 is properly positioned, the subject can release the proximal end portions 220a-b. Subsequently, the spring force exerted by the spring mechanism 214 can pivot the signal delivery element 202 upward and into engagement with a target region of the ear 180, such as within the cymba concha 192 and/or against the inferior crus 183b. The spring mechanism 214 can bias the signal delivery element 202 away from the ear canal 194 and/or against the cymba concha 192. Accordingly, the biasing spring force can place the electrodes 204 into snug contact with the cymba concha 192 (or other target region). The spring mechanism 214 allows the earpiece 200 to be used with a variety of different ear anatomies. For example, the spring mechanism 214 allows the positioning of the signal delivery element 202 and retention element 208 to be automatically adjusted to accommodate for different ear sizes (e.g., different vertical distances between the cymba concha 192 and ear canal 194).

The earpiece 200 can be operably coupled to a signal generator and/or another a functional component (e.g., a mobile device) via wired or wireless communication linkages. For example, the earpiece 200 can include one or more wires 232 connecting the electrodes 204 to a signal generator (not shown). The wires 232 can also connect the earbud 210 to an audio device for producing audio signals. In other embodiments, however, the earpiece 200 can be connected to the signal generator via a wireless linkage or connection. Additional details of signal generators and other components suitable for use with the earpiece 200 are described further below.

Figure 3A:
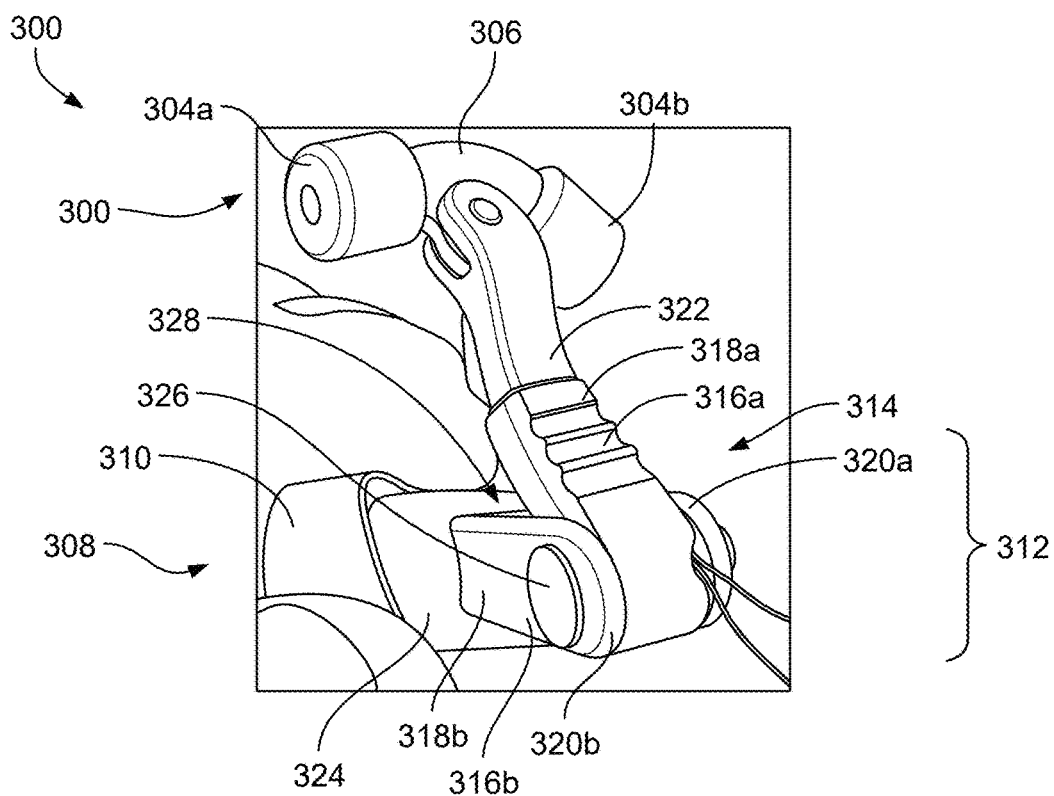
FIGS. 3A and 3B illustrate another representative earpiece configured in accordance with embodiments of the present technology.
Figure 3B:
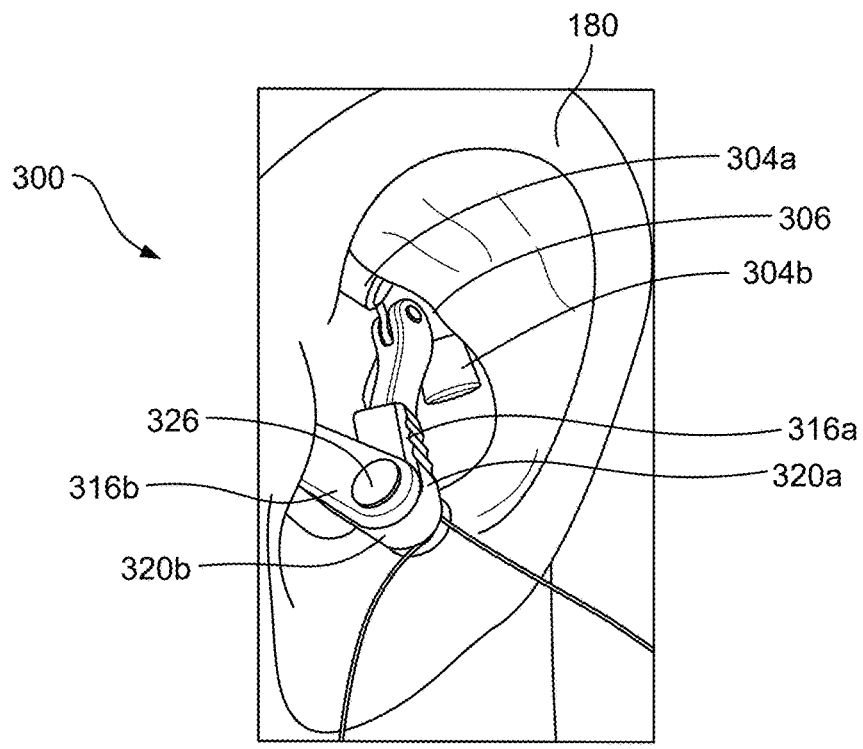

FIGS. 3A and 3B illustrate another representative earpiece 300 configured in accordance with embodiments of the present technology. More specifically, FIG. 3A is a perspective view of the earpiece 300 by itself and FIG. 3B is a perspective view of the earpiece 300 positioned in a subject's ear 180. Elements of the earpiece 300 can be at least generally similar or identical in structure and/or function to those of the earpiece 200 of FIGS. 2A and 2B. For example, as shown in FIG. 3A, the earpiece 300 can include a signal delivery element 302 having first and second electrodes 304a-b (collectively, electrodes 304) carried by an elongate support member 306, and a retention element 308 including an earbud 310. Accordingly, like numbers are used to indicate at least generally similar or identical elements (e.g., signal delivery element 302 versus signal delivery element 202), and the following discussion of the earpiece 300 will be limited to those features that differ from the earpiece 200 of FIGS. 2A and 2B.

The earpiece 300 can have a more compact, lower profile adjustment mechanism 312 compared to the earpiece 200 of FIGS. 2A and 2B. For example, the adjustment mechanism 312 can be or include a spring mechanism 314 having a first arm member 316a connected to the signal delivery element 302 (e.g., via a linkage member 322) and a second arm member 316b connected to the retention element 308 (e.g., via an earbud support 324). The first and second arm members 316a-b can be rotatably coupled to each other at a pivot joint 326. In the illustrated embodiment, the pivot joint 326 is located at or near the respective proximal end portions 320a-b of the first and second arm members 316a-b. For example, the second arm member 316b can include a slot or aperture 328 formed in the second proximal end portion 320b, and the first proximal end portion 320a of the first arm member 316a can be positioned within the aperture 328. In other embodiments, however, the aperture 328 can be located in the first arm member 316a rather than the second arm member 316b, or the first and second arm members 316a-b can be positioned side by side.

Referring next to FIG. 3B, the first and second arm members 316a-b can rotate relative to each other about the pivot joint 326 to accommodate the anatomy of the subject's ear 180. Additionally, one or both of the first and second arm members 316a-b can include ridges, texturing, and/or other elements between the respective distal end portions 318a-b and proximal end portions 320a-b, e.g., to facilitate handling, insertion, and/or adjusting of the earpiece 300. The elongate support member 306 can be rotated, e.g., relative to the first arm member 316a, to facilitate positioning of the electrodes 304a-b.

Figure 3C:
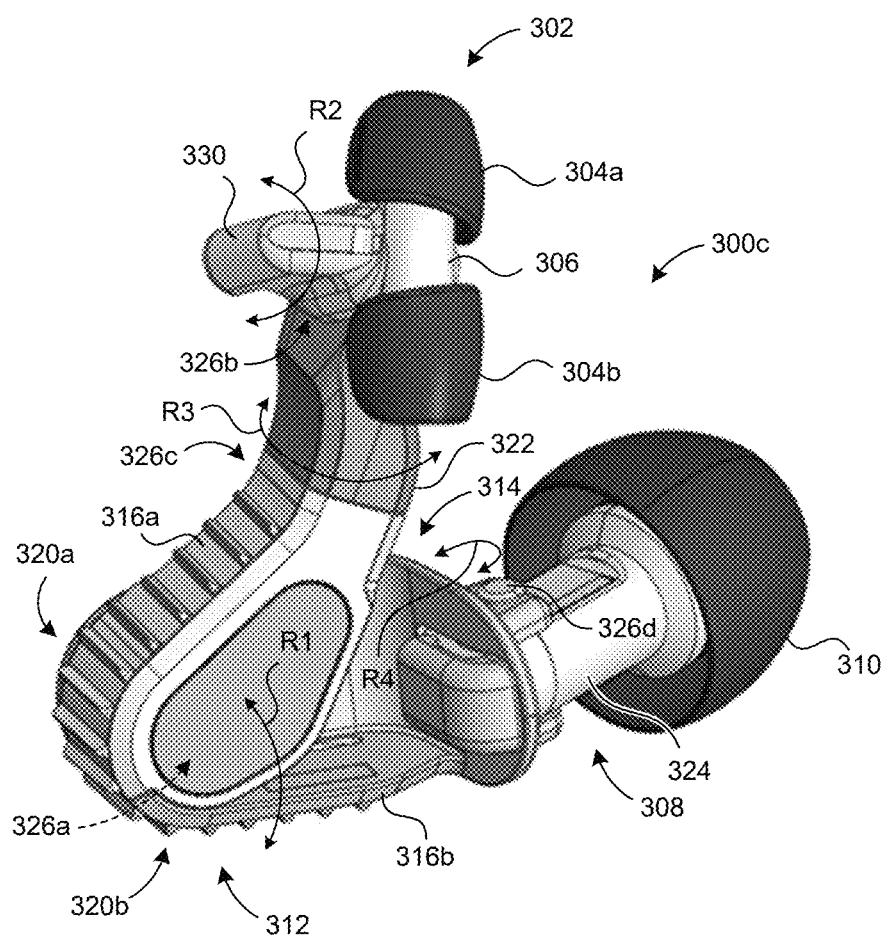
FIG. 3C illustrates another representative earpiece configured in accordance with embodiments of the present technology.

FIG. 3C illustrates another representative earpiece 300c configured in accordance with embodiments of the present technology, and having several features that are at least generally similar or identical in structure and/or function to the earpiece 300 shown in FIGS. 3A-3B and/or the earpiece 200 shown in FIGS. 2A-2B. For example, the earpiece 300c can include a signal delivery element 302 having first and second electrodes 304a, 304b carried by an elongate support member 306, and a retention element 308 carrying an earbud 310. The earpiece 300c can include one or more adjustment mechanisms, for example, an adjustment mechanism 312 that can be (or can include) a spring mechanism 314 having an internal spring (not visible in FIG. 3C). The spring biases the first arm member 316a (coupled to the signal delivery element 302, e.g., via a linkage member 322) away from the second arm member 316b (coupled to the retention element 308, e.g., via the earbud support 324). The first and second arm members 316a-b can pivot relative to each other at a first pivot joint 326a, as indicated by arrow R1. The earpiece 300c can facilitate rotations at other pivot joints, in addition to or in lieu of the first pivot joint 326a. For example, the support member 306 can be carried by a finger grip element 330, which is coupled to the linkage member 322 at a second pivot joint 326b and configured to rotate relative to the linkage member 322 in the directions indicated by arrow R2. The linkage member 322 can rotate relative to the first arm member 316a at a third pivot joint 326c, as indicted by arrow R3. The earbud support 324 can rotate relative to the second arm member 316b at a fourth pivot joint 326d, as indicated by arrow R4. The foregoing additional degrees of freedom allow the wearer to more accurately conform the earpiece to his/her physiology.

In the illustrated embodiment, the pivot joints 326a-d are in series with one another and/or between the support member 306 and the earbud 310, e.g., the second pivot joint 326b is in series between the support member 306 and the third pivot joint 326c, the third pivot joint 326c is in series between the second pivot joint 326b and the first pivot joint 326a, the first pivot joint 326a is in series between the third pivot joint 326c and the fourth pivot joint 326d, and/or the fourth pivot joint 326d is in series between the first pivot joint 326a and the earbud 310. Each of the pivot joints 326 can have a respective axis of rotation that is non-parallel (e.g., 90°, 75°, 60°, 45°, 30°, 15°, etc.) to the axis of rotation of at least one immediately adjacent or neighboring pivot joint. For example, the axis of rotation of the second pivot joint 326b can be non-parallel to the axis of rotation of the third pivot joint 326c, the axis of rotation of the third pivot joint 326c can be non-parallel to the axis of rotation of the second pivot joint 326b and/or the first pivot joint 326a, and/or the axis of rotation of the first pivot joint 326a can be non-parallel to the axis of rotation of the third pivot joint 326c and/or the fourth pivot joint 326d. In these and other embodiments, the earpiece 300c can include more or fewer pivot joints and/or pivot joints in other suitable arrangements.

Other elements of the system can also facilitate tailoring the earpiece to specific users. For example, the user can select from springs having different spring constants, for biasing the first and second arms away from each other with different levels of force. The sizes, shapes, and/or materials for the earbud 310 and either/both of the electrodes 304 can be selected in accordance with patient preferences.

Figure 4A:
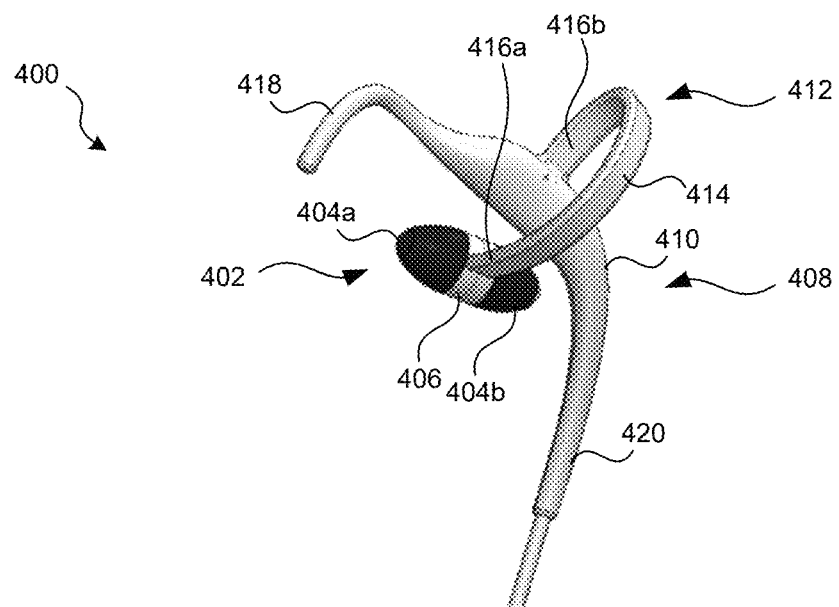
FIGS. 4A-4D illustrate a representative earpiece configured in accordance with embodiments of the present technology.
Figure 4B:
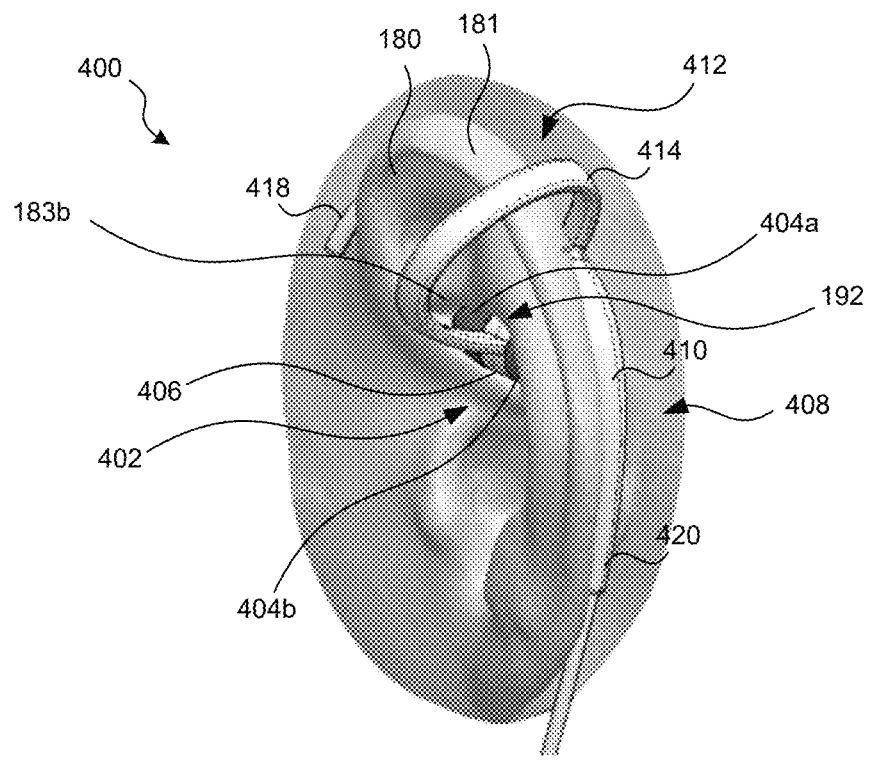
Figure 4C:
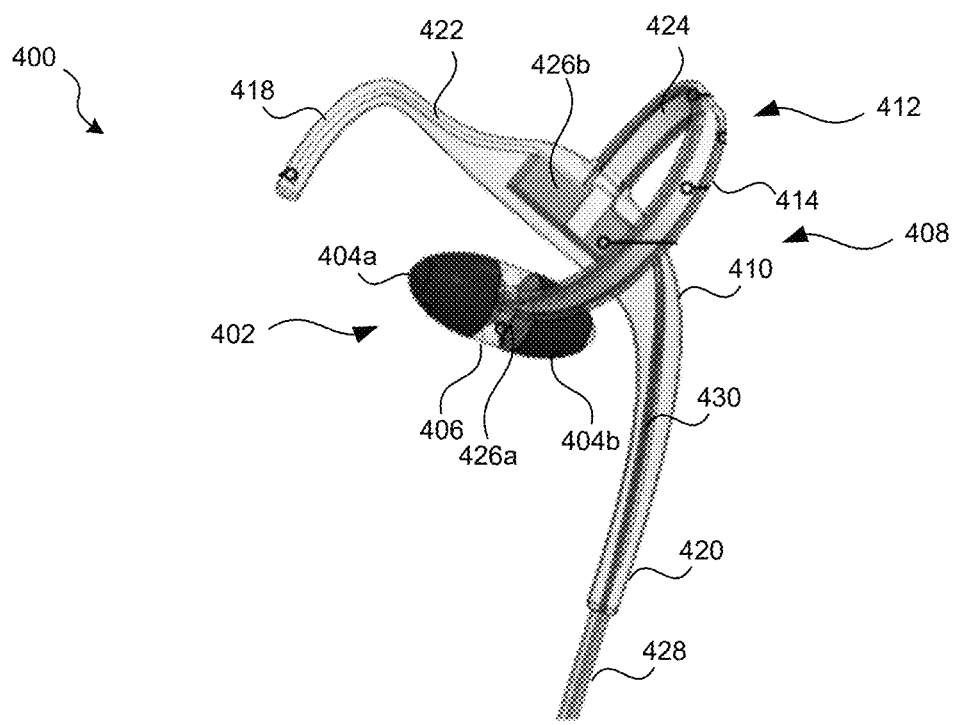
Figure 4D:
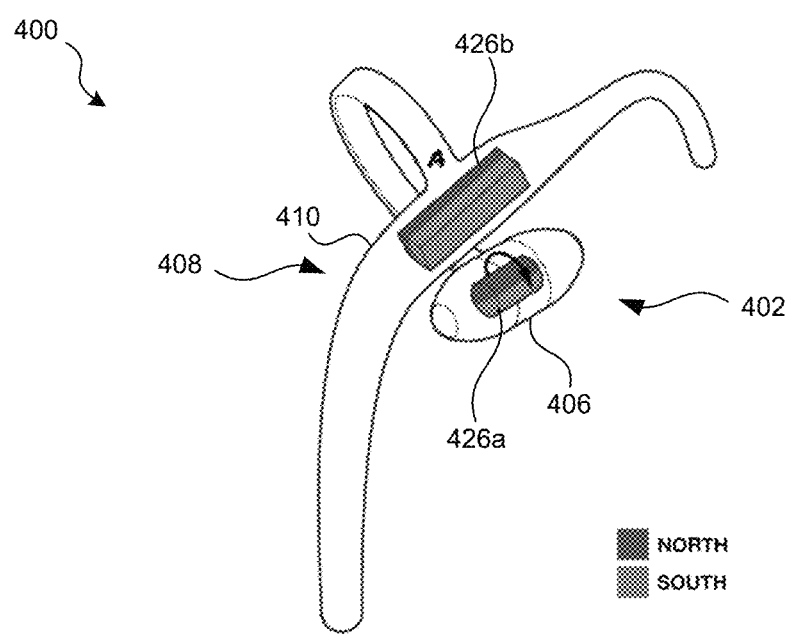

FIGS. 4A-4D illustrate a representative earpiece 400 configured in accordance with embodiments of the present technology. More specifically, FIG. 4A is a perspective view of the earpiece 400 by itself, FIG. 4B is a perspective view of the earpiece 400 on a subject's ear 180, and FIGS. 4C and 4D are perspective views of the internal components of the earpiece 400.

Referring first to FIG. 4A, the earpiece 400 includes a signal delivery element 402 carrying at least two electrodes 404 (e.g., a first electrode 404a and a second electrode 404b). In the illustrated embodiment, the signal delivery element 402 is or includes a rounded, generally ellipsoid, ovoid, or bullet-shaped capsule 406, and the electrodes 404 are located at or near the opposite end portions of the capsule 406. In other embodiments, the capsule 406 can have a different shape (e.g., spherical, cylindrical, or another suitable shape.). The size of the capsule 406 can be varied as desired to provide a snug fit with the ear (e.g., within the cymba concha, as described in greater detail below). For example, the capsule 406 can have a diameter (e.g., a maximum, minimum, or average diameter) within a range from 0.5 cm to 1.5 cm, and/or a length within a range from 0.5 cm to 1.5 cm. The electrodes 404 can be transcutaneous electrodes made of a conductive material suitable for delivering electrical signals to the subject's auricular nerve. For example, the electrodes 404 can be made of a conductive silicone, other conductive polymer, and/or a metal (e.g., copper). The capsule 406 can be made of a non-conductive material, such as plastic, rubber, resin, or other suitable material.

The earpiece 400 also includes a retention element 408 for securing the earpiece 400 to a portion of the subject's ear (e.g., the posterior portion of the ear, as discussed further below). The retention element 408 can also be used as a guide for aligning the signal delivery element 402 with the target region of the ear. In some embodiments, the retention element 408 includes an elongate body portion 410 having a curved shape configured to engage the corresponding portion of the subject's ear. The body portion 410 can be made of a compliant, soft material, such as rubber (e.g., Shore 50A to Shore 80A rubber), plastic, and/or another suitable material. In some embodiments, the body portion 410 is bendable and/or deformable to conform to the particular shape of the subject's ear.

The earpiece 400 also includes an adjustment mechanism 412 allowing the signal delivery element 402 to move relative to the retention element 408 (e.g., with respect to up to three degrees of translational freedom and/or up to three degrees of rotational freedom) to place the electrodes 404 in contact with the target region of the ear. In the illustrated embodiment, the adjustment mechanism 412 is or includes a flexible member 414 (e.g., a ribbon, strap, cable, wire, or other elongate element) connecting the signal delivery element 402 to the retention element 408. For example, the flexible member 414 can include a first end portion 416a coupled to the capsule 406 of the signal delivery element 402 and a second end portion 416b coupled to the body portion 410 of the retention element 408. The flexible member 414 can be made of any suitable elastic, bendable material, such as a polymer and/or a metal. The flexible member 414 can extend perpendicularly and/or outwardly from the body portion 410, and can be sufficiently long to accommodate different ear sizes. For example, the flexible member 414 can have a length greater than or equal to 2 cm, 3 cm, 4 cm, 5 cm, 6 cm, 7 cm, 8 cm, 9 cm, or 10 cm. Additionally, the width and thickness of the flexible member 414 can also be configured to provide sufficient mechanical strength while maintaining flexibility. In some embodiments, the flexible member 414 has a thickness less than or equal to 0.25 mm, 0.5 mm, 0.75 mm, 1 mm, 1.25 mm, 1.5 mm, 1.75 mm, or 2 mm; and a width less than or equal to 1 mm, 2 mm, 3 mm, 4 mm, 5 mm, 6 mm, 7 mm, 8 mm, 9 mm, or 10 mm.

Referring next to FIG. 4B, when the earpiece 400 is positioned on the subject's ear 180, the body portion 410 can secure the earpiece 400 to the ear 180 by engaging the posterior portion of the ear 180. The body portion 410 can optionally include a hook member 418 configured to secure the body portion 410 to the upper portion of the ear 180 near the subject's temple, and/or a tail member 420 extending downward from the body portion 410 and along the back of the ear 180. In the illustrated embodiment, when the earpiece 400 is worn on the subject's ear 180, the flexible member 414 can extend over the helix 181 and toward the front of the ear 180 to position the signal delivery element 402 at or near the cymba concha 192 (or other target region of the ear 180).

Referring next to FIG. 4C, the body portion 410 optionally includes an embedded wire 422 extending partially or entirely through the interior of the body portion 410 (e.g., through the hook member 418 and/or tail member 420). The embedded wire 422 can be adjusted (e.g., bent) to hold the body portion 410 (e.g., including the hook member 418 and/or tail member 420) in a particular shape to conform to and/or grip the ear 180. Similarly, the flexible member 414 can optionally include an internal wire or cable 424 (e.g., made of spring steel or other metallic material) embedded within a compliant outer material (e.g., rubber) to provide mechanical strength and/or elasticity to the flexible member 414.

Referring next to FIG. 4D, the earpiece 400 can further include one or more magnetic elements configured to bias the signal delivery element 402 into engagement with the ear 180. For example, the earpiece 400 can include a first magnetic element 426a carried by the signal delivery element 402 and a second magnetic element 426b carried by the retention element 408. In the illustrated embodiment, the first magnetic element 426a has a cylindrical shape and is positioned within the capsule 406 of the signal delivery element 402 in a free-floating configuration. As such, the first magnetic element 426a can rotate around its longitudinal axis to a plurality of different orientations. The second magnetic element 426b can have a bar or rod shape, and can be positioned within the body portion 410 of the retention element 408. In some embodiments, the second magnetic element 426b is embedded within the body portion 410 in a fixed position and/or orientation.

When the signal delivery element 402 is placed in proximity to the retention element 408, the magnetic attraction between the first and second magnetic elements 426a-b can bias the signal delivery element 402 toward the retention element 408. When the earpiece 400 is worn, the magnetic force can pull the signal delivery element 402 against the target region of the ear 180 so the capsule 406 "snaps" against the cymba concha 192 and/or inferior crus 193b (FIG. 4B)). Optionally, the first magnetic element 426a can rotate within the capsule 406 to align the first magnetic element 426a with the second magnetic element 426b, which can increase the magnitude of the attractive force between the first and second magnetic elements 426a-b. Accordingly, the signal delivery element 402 can be secured to the appropriate location on the ear. The magnetic force between the first and second magnetic elements 426a-b can be sufficiently large to maintain the positioning of the electrodes 404 and prevent them from being inadvertently dislodged (e.g., during normal activity such as walking, turning of the head, or other movements). In representative embodiments, the magnetic force between the magnets 426a, 426b can be 6 pounds or less.

The characteristics of the first and second magnetic elements 426a-b can be configured to produce a biasing force to sufficient to maintain a desired amount of surface contact between the electrodes 404 and the ear. For example, one or both of the first and second magnetic elements 426a-b can be neodymium magnets. The first magnetic element 426a can have a length within a range from 5 mm to 20 mm (e.g., 6.4 mm, 9.5 mm, 12.7 mm, 15.6 mm, 16.6 mm, or 17.6 mm), and a height or diameter within a range from 3 mm to 10 mm (e.g., 3.2 mm, 4.8 mm, 5.6 mm, 6.6 mm, 7.6 mm). The second magnetic element 426b can have a length within a range from 5 mm to 20 mm (e.g., 12.7 mm), a width within a range from 2 mm to 5 mm (e.g., 3.2 mm or 6.4 mm), and a height within a range from 2 mm to 5 mm (e.g., 3.2 mm or 6.4 mm). The fit between the electrodes 404 and the ear 180 can produce a skin-electrode impedance less than or equal to 30,000 Ohms, 25,000 Ohms, 20,000 Ohms, 15,000 Ohms, 10,000 Ohms, or 5,000 Ohms. Additionally, the fit between the electrodes 404 and the ear 180 can produce an electrode-to-skin contact area in a range of from 20% to 100% of the exposed electrode surface area, which can reduce the likelihood of paresthesia during signal delivery.

Referring again to FIG. 4C, the earpiece 400 can be connected to an external signal generator (or other functional component) via a wired linkage, such as a cable 428 coupled to the tail member 420 of the earpiece 400. In the illustrated embodiment, the earpiece 400 includes one or more wires 430 connecting the electrodes 404 to an external signal generator (or other functional component). The wire(s) 430 can be electrically coupled to the electrodes 404 (e.g., via a conductive ink, a conductive adhesive, or any other suitable mechanism), and can extend through the flexible member 414, body portion 410, tail member 420, and cable 428. In other embodiments, however, the earpiece 400 can be connected to one or more external devices via a wireless linkage, as discussed in further detail below.

Figure 5A:
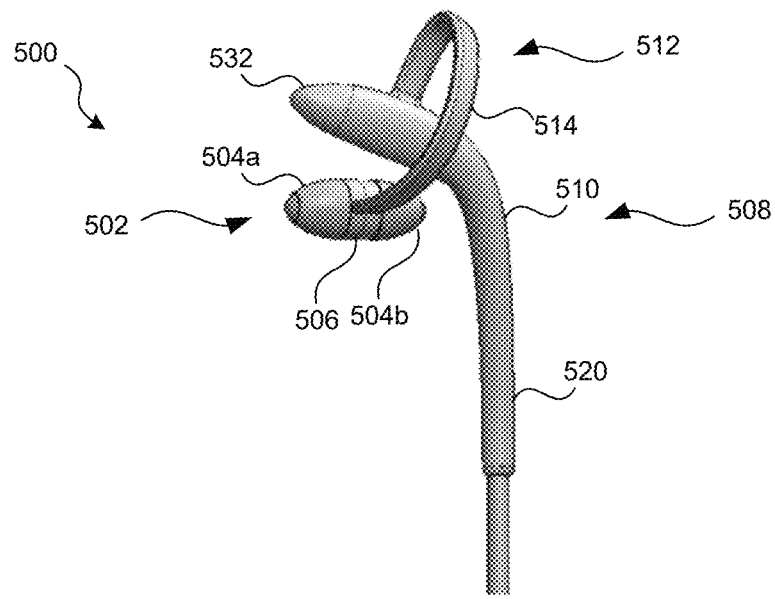
FIGS. 5A and 5B illustrate another representative earpiece configured in accordance with embodiments of the present technology.
Figure 5B:
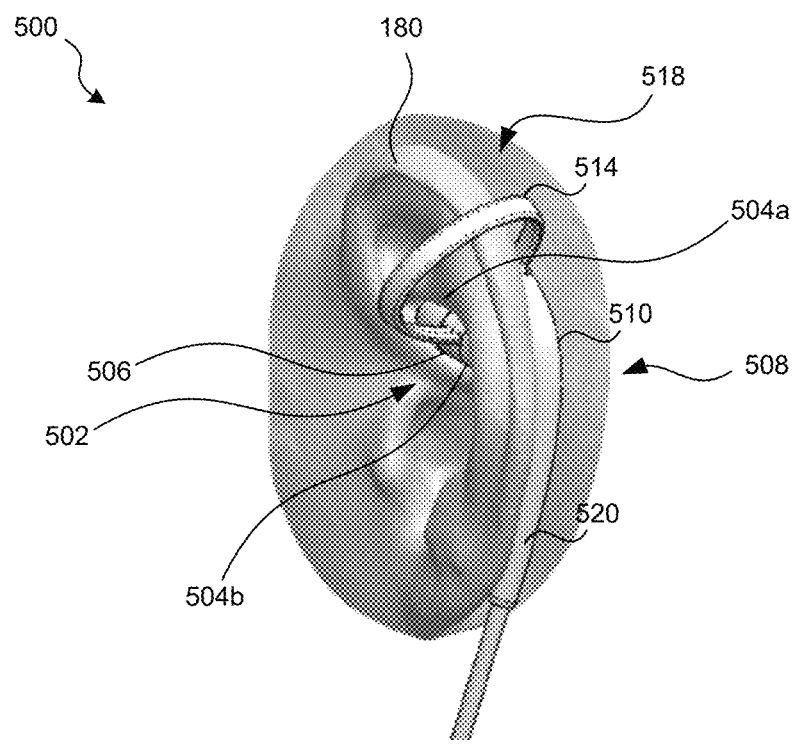

FIGS. 5A and 5B illustrate another representative earpiece 500 configured in accordance with embodiments of the present technology. More specifically, FIG. 5A is a perspective view of the earpiece 500 by itself and FIG. 5B is a perspective view of the earpiece 500 positioned in a subject's ear 180. Elements of the earpiece 500 can be at generally similar or identical in structure and/or function to those of the earpiece 400 of FIGS. 4A-4D. For example, as shown in FIG. 5A, the earpiece 500 can include a signal delivery element 502 having first and second electrodes 504a-b (collectively, electrodes 504) carried by a capsule 506 having a first magnetic element (not shown), a retention element 508 having a body portion 510 with a second magnetic element (not shown), and an adjustment mechanism 512 including a flexible member 514 to adjust the positioning of the signal delivery element 502 relative to the retention element 508. Accordingly, like numbers are used to indicate identical or similar elements (e.g., signal delivery element 502 versus signal delivery element 402), and the following discussion of the earpiece 500 will be limited to those features that differ from the earpiece 400 of FIGS. 4A-4D.

The body portion 510 of the earpiece 500 includes a tail member 520 extending downward and behind the ear 180, but does not include any hook member or other element to grip the upper portion of the ear 180 (FIG. 5B). Instead, as shown in FIG. 5A, the upper part of the body portion 510 terminates in a rounded tip 532. This configuration can improve fit and comfort (e.g., particularly for subjects with smaller ears), and can reduce the overall size of the earpiece 500.

Figure 6C:
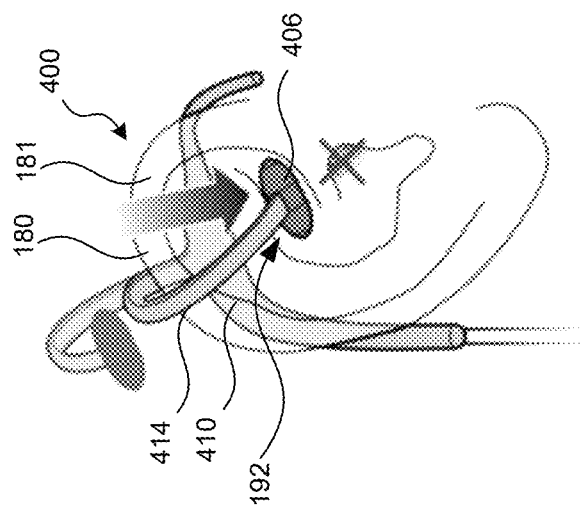
FIGS. 6A-6E illustrate a representative procedure for positioning an earpiece on a subject in accordance with embodiments of the present technology.
Figure 6B:
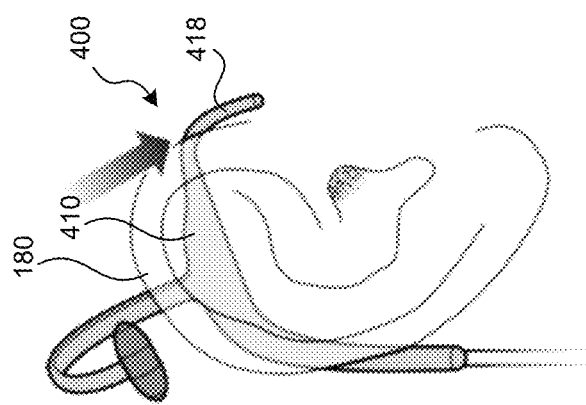
Figure 6A:
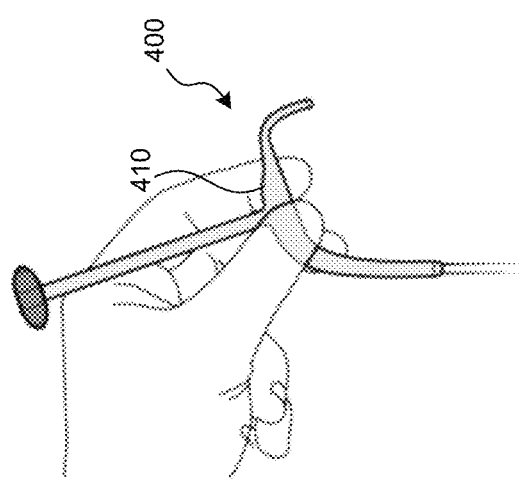

FIGS. 6A-6E are partially schematic illustrations of a representative procedure for positioning an earpiece 400 on a subject's ear 180 in accordance with embodiments of the present technology. Although the procedure of FIGS. 6A-6E is illustrated and described with respect to the earpiece 400 of FIGS. 4A-4D, the techniques described with respect to FIGS. 6A-6E can also be applied to the other earpieces described herein (e.g., earpiece 500 of FIGS. 5A and 5B). The procedure begins with the subject (or another individual) grasping the earpiece 400 by the body portion 410 (FIG. 6A). The subject then positions the body portion 410 of the earpiece 400 behind the ear 180 (FIG. 6B). In embodiments where the body portion 410 includes a hook member 418, the hook member 418 can be used as a reference to position the earpiece 400 properly with respect to the ear 180. For example, the subject can place the hook member 418 over and around the upper portion of the ear 180.

Figure 6D:
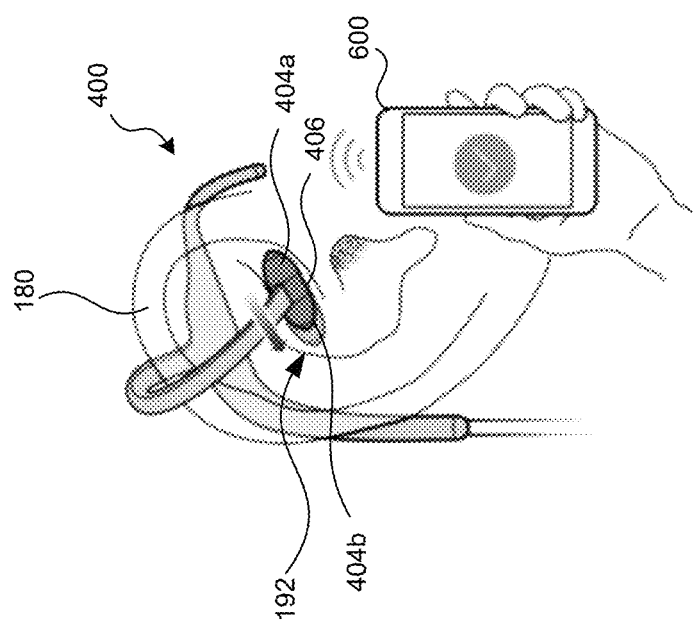
Figure 6E:
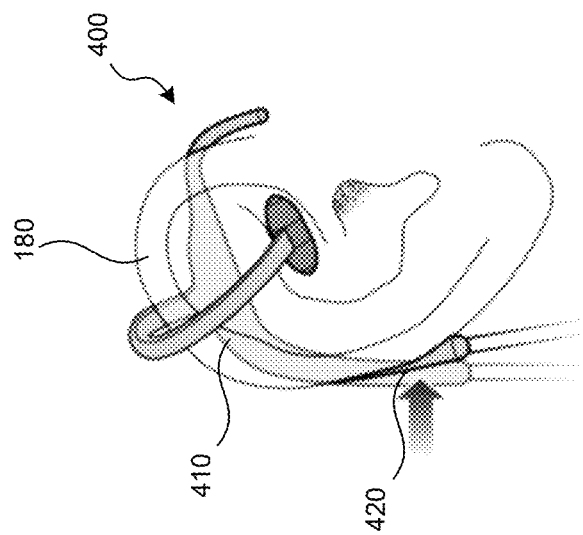

Subsequently, the subject can move the capsule 406 of the earpiece 400 over the helix 181 of the ear 180 and toward the target region (e.g., cymba concha 192) (FIG. 6C). During this process, the flexible member 414 can bend and/or deform so the subject can adjust the position and/or orientation of the capsule 406. When the capsule 406 is sufficiently close to the body portion 410, the respective magnetic elements within these components (not shown) can draw the capsule 406 toward the body portion 410 and against the skin of the cymba concha 192. Optionally, the subject can verify whether the electrodes 404a-b of the earpiece 400 are in sufficient contact with the cymba concha 192, e.g., via an application on a mobile device 600 (e.g., smartphone) or other external device in communication with the earpiece 400 (FIG. 6D). If appropriate, the subject can reposition the earpiece 400 until the surface contact between the electrodes 404a-b and ear 180 is sufficient for transdermal signal delivery. In some embodiments, the subject can further secure the earpiece 400 to the ear 180 by bending or otherwise moving the tail member 420 of the body portion 410 toward the back of the ear 180 (FIG. 6E). Once the earpiece 400 is positioned properly, the earpiece 400 can be used to deliver electrical signals to the subject's auricular nerve, as discussed in greater detail below.

Figure 7:
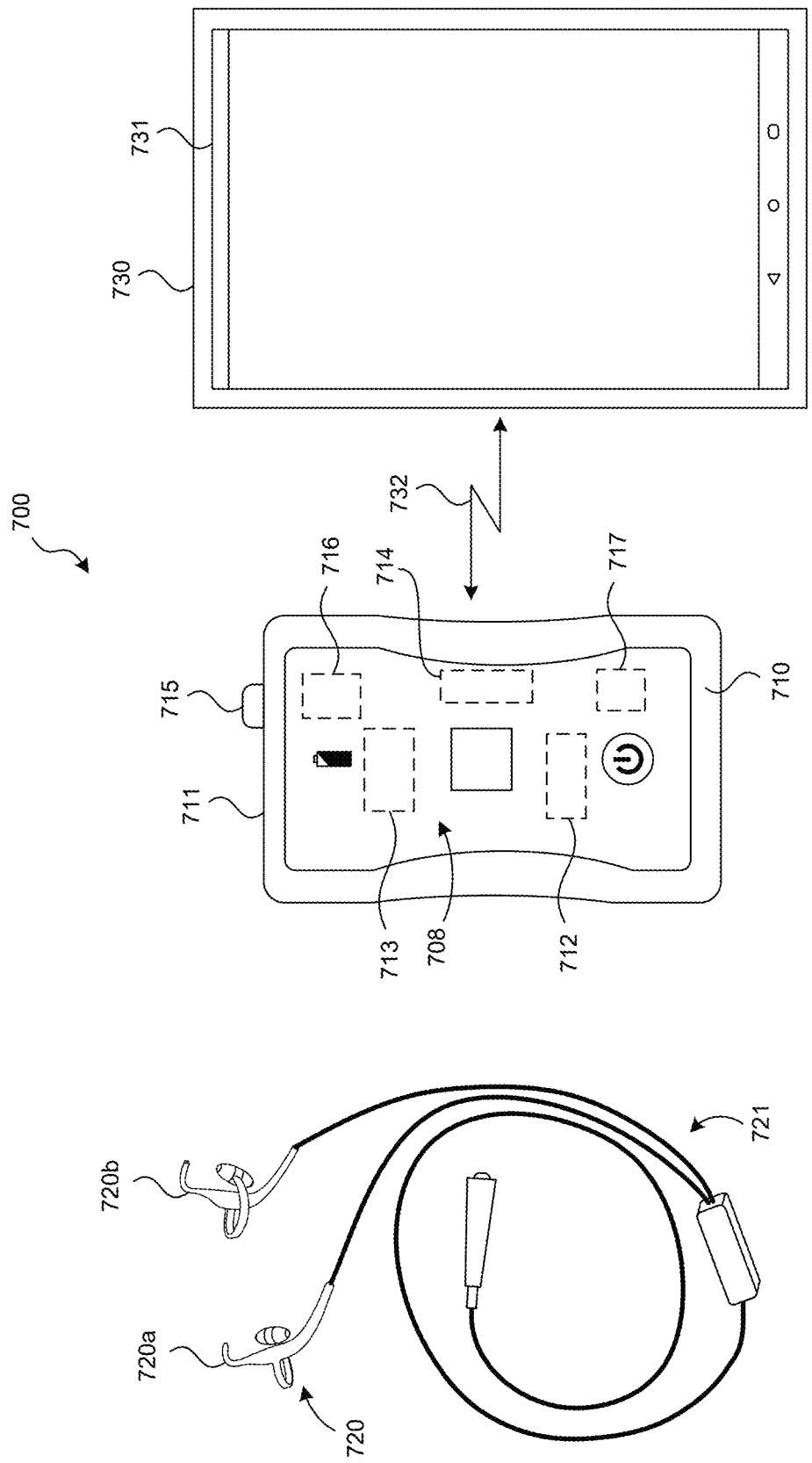
FIG. 7 is a partially schematic illustration of a system having earpieces, a signal generator, and an external controller arranged in accordance with embodiments of the present technology.

FIG. 7 is a partially schematic illustration of a representative system 700 for transcutaneously delivering electrical signals to the auricular branches of the patient's vagus nerves, in accordance with embodiments of the present technology. The system 700 includes a signal generator 710 coupled to one or more earpieces 720 (shown as a left earpiece 720a and a right earpiece 720b), and an external controller 730. The earpieces 720 can be or include any of the earpieces described herein, e.g., with respect to FIGS. 2A-6E. The signal generator 710 can include a housing 711 that encloses or partially encloses signal generating circuitry 714. The signal generating circuitry 714 can be controlled by an internal controller 708, e.g., a processor 713 that accesses instructions stored in a memory 712. The signal generator 710 can include a signal transmission port 715 for communicating with the earpieces 720, e.g., transmitting an electrical therapy signal to the earpieces 720, and optionally, receiving feedback or other communications from the earpieces 720. When the system 700 is in use, the electrical therapy signal is in electrical communication with the target neural population to create a desired effect on the target neural population. A communications transceiver 716 provides for communication between the signal generator 710 and the external controller 730.

The earpieces 720 can be coupled to the signal generator 710 via one or more earpiece links 721. In particular embodiments, the earpiece link 721 includes a wired link e.g., a cable or other elongated conductor. In other embodiments, the earpiece link 721 can include a wireless connection. The earpiece link or links 721 can be connected to each of the earpieces 720 to provide the same input to each, or differentiated inputs to each. The earpiece link(s) 721 can also direct communications (e.g., patient data) back to the signal generator 710, e.g., from sensors carried by the earpieces 720.

The signal generator 710 can be configured to rest on any suitable surface (e.g., a table top), or can be carried by the patient in the patient's hand or in a holster or in another suitable manner. The signal generator 710 can be powered by a power source 717, e.g., one or more batteries (e.g., rechargeable batteries) and/or an external power source. In particular embodiments, the signal generator 710 is controlled by the external controller 730 via a controller link 732. The external controller 730 can include a cellular phone or other mobile device (e.g., a smartwatch), and can access a specific phone-based app 731 to provide controls to the signal generator 710. In operation, a physician or other suitable practitioner can set the stimulation parameters at the signal generator 710 via the external controller 730, and the patient and/or the practitioner can update the signal delivery parameters via the same or a different external controller 730. In some embodiments, the practitioner can have control over more parameters than the patient does, for example, to better control possible patient outcomes. The practitioner (and/or others) can direct or otherwise affect the internal controller 708 remotely via the external controller 730 and/or other devices, e.g., a backend device as described further with reference to FIG. 8.

Figure 8:
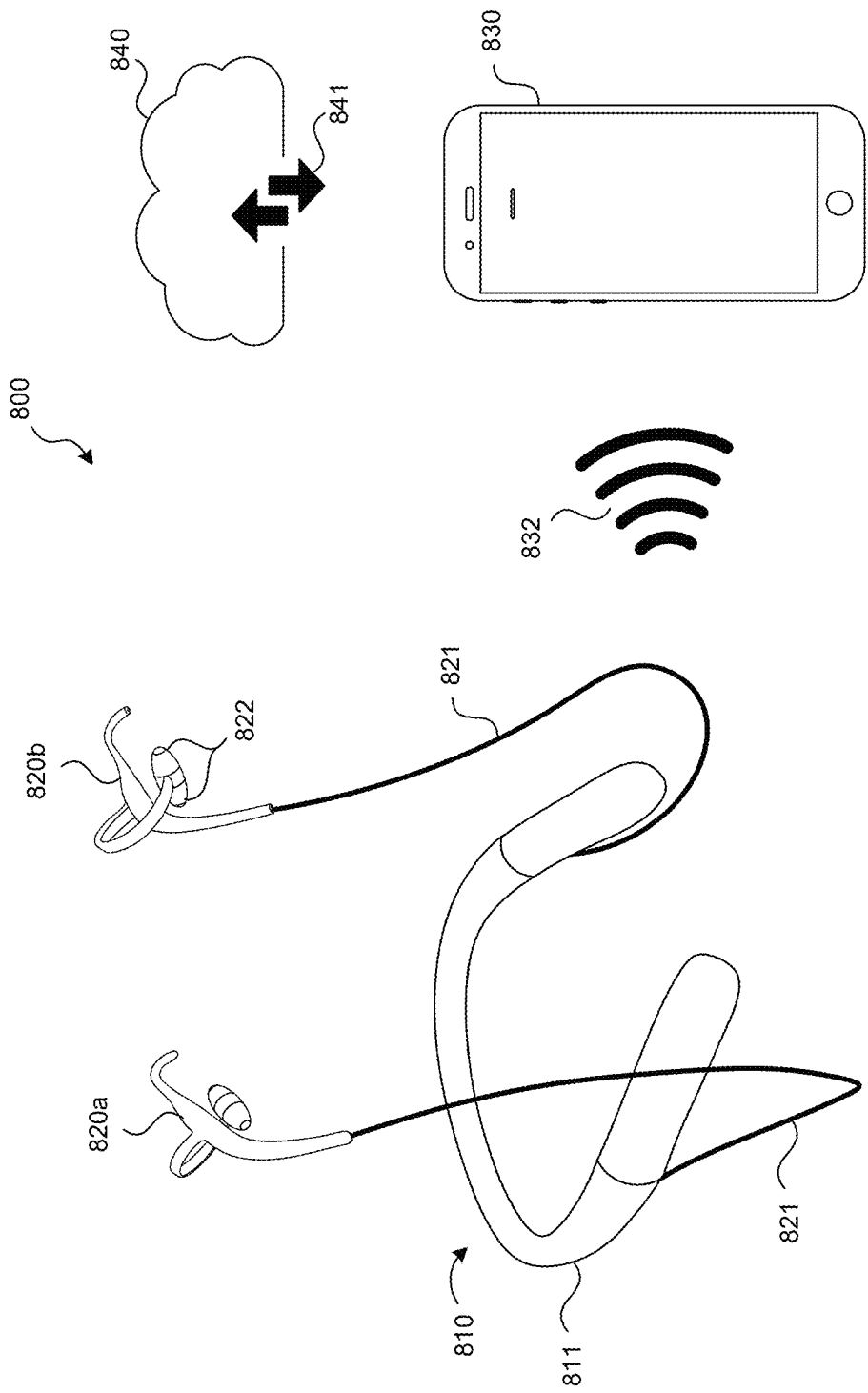
FIG. 8 is a partially schematic illustration of a system having a signal generator positioned within a housing that fits around the patient's neck, in accordance with embodiments of the present technology.

FIG. 8 is a partially schematic illustration of another representative system 800 configured in accordance with embodiments of the present technology. The system 800 includes a signal generator 810 that has a generally horseshoe-shaped housing 811 so as to fit comfortably around the patient's neck when in use, and can accordingly be referred to herein as a neckpiece. The housing 811 can in turn include the internal components described above with reference to FIG. 7. Two earpiece links 821 (e.g., in the form of flexible cables) connect the signal generator 810 to corresponding earpieces 820a-b, which each carry two electrodes 822. The earpieces 820a-b can be or include any of the earpieces described herein, e.g., with respect to FIGS. 2A-6E. The signal generator 810 can be controlled by an external controller 830 via a wireless controller link 832. The external controller 830 can accordingly be used to set and/or adjust the signal delivery parameters in accordance with which the signal generator 810 provides therapeutic electrical signals to the earpieces 820.

The external controller 830 can also communicate with a backend device 840 (e.g., a server or other suitable device located on the cloud or other medium) via a backend link 841. Accordingly, the external controller 830 can exchange data with the backend 840. For example, the external controller 830 can provide the backend 840 with information about the patient's condition (e.g., obtained from feedback sensors included in the system 800), and/or a schedule of the signal delivery parameters selected by the patient or practitioner over the course of time. In addition, (or alternatively), the backend 840 can be used to provide updates to the phone-based app or other software contained on the external controller 830. The allocation of processing tasks and/or data storage between the internal controller 708 (FIG. 7), the external controller 830 and the backend 840 can be selected to suit the preferences of the patient, practitioner, and/or others.

4.0 Representative Signal Delivery Parameters

The representative devices and systems described above deliver electrical signals to the patient in accordance with selected signal delivery parameters. The signal delivery parameters can include the characteristics defining or describing the signal, and the location to which the signal is delivered. In at least some embodiments, the signal is biphasic and is applied at a frequency in a range of about 15 kHz to about 50 kHz. However, in other embodiments, the representative devices and systems described above can deliver electrical signals in accordance with other parameter values, as indicated below.

Figure 9:
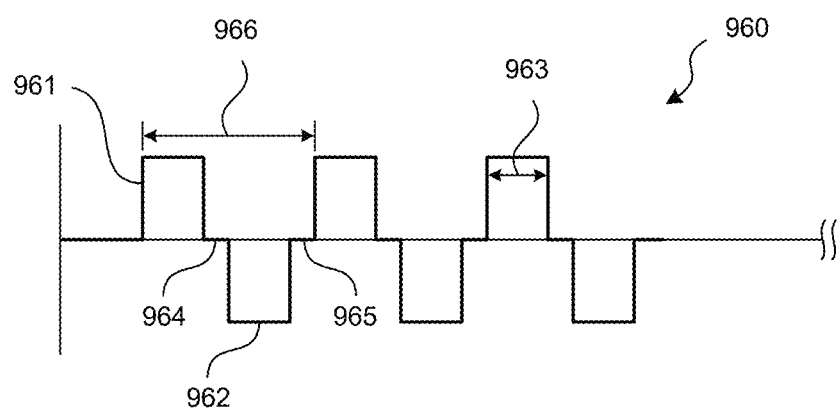
FIG. 9 is a schematic illustration of a representative waveform in accordance with embodiments of the present technology.

FIG. 9 is a schematic illustration of a representative signal 960. The signal (e.g., the signal wave form) includes anodic pulses 961 and cathodic pulses 962 separated by an interphase spacing 964. Individual pairs of anodic and cathodic pulses 961, 962 can be separated from neighboring pairs by an interpulse spacing 965. Each pulse can have a pulse width 963, which can be the same for anodic pulses 961 as for cathodic pulses 962, or different, depending upon the embodiment. The repeating period 966 of the signal 960 is made up of the anodic pulse 961, the cathodic pulse 962, the interphase spacing 964, and the interpulse spacing 965. The inverse of the period 966 corresponds to the frequency of the signal.

In representative embodiments, at least a portion of the signal 960 has signal delivery parameters in the following ranges:

Frequency: about 1 Hz to about 50 KHz; about 1 Hz to about 10 Hz; about 10 Hz to about 100 Hz; about 100 Hz to about 300 Hz; abut 300 Hz to about 2 kHz; about 1 kHz to about 10 KHz; about 10 KHz to about 25 kHz; about 25 kHz to about 50 KHz; about 15 kHz to about 50 KHz; about 20 KHz to about 50 KHz; or 20 KHz.

Amplitude: about 0.1 mA to about 10 mA, or about 1 mA to about 5 mA, or about 2 mA to about 4 mA.

Pulse width: about 5 microseconds to about 30 microseconds, e.g., about 20 microseconds Interphase spacing: about 1 microsecond to about 40 microseconds, or about 1 microsecond to about 10 microseconds.

Interpulse spacing: about 1 microsecond to about 40 microseconds, about 1 microsecond to about 15 microseconds, or about 1 microsecond to about 15 microseconds Duty cycle: on-period of 0.1 seconds-15 minutes
off-period of 0.1 seconds-15 minutes In some embodiments, the signal 960 (e.g., the values of the foregoing parameters) remains constant for the duration that the signal is delivered. In other embodiments, one or all of the foregoing parameters can vary, with the average value remaining in the foregoing ranges. For example, the frequency can be varied, while the average frequency remains within any of the foregoing ranges. Representative varying waveforms include Gaussian and/other non-linear waveforms. The average frequency corresponds to the inverse of the average period of the signal taken over multiple periods. As described above, an individual period is the sum of the anodic pulse width (e.g., a first pulse width), the cathodic pulse width (e.g., a second pulse width) of a neighboring pulse, the interphase spacing, and the interpulse spacing. Any of the foregoing signals can be delivered in the form of an amplitude-modulated waveform, e.g., with a first (lower frequency) wave of, for example, 1 Hz to 100 Hz, superposed on a second (higher frequency) wave of, for example, 1 kHz to 50 KHz.

As described herein, at least a portion of the signal has parameters within the foregoing ranges. Accordingly, in some embodiments, the signal can deviate from the foregoing ranges so long as doing so does not significantly impact the efficacy of the therapy and/or the comfort of the patient.

The electrical therapy signal is typically delivered to the patient over the course of one or more sessions that have a limited duration. For example, an individual session typically lasts no longer than sixty minutes and is typically at least two seconds in duration. In more particular embodiments, the duration ranges from about two seconds to about thirty minutes, and in a further particular embodiment, the duration is from five minutes to twenty minutes, or about fifteen minutes. The patient can receive treatment sessions at most once per day, at most twice per day, or at other suitable intervals, depending, for example, on the patient's response to the therapy. In a representative embodiment, the patient receives therapy in two 15 minute sessions, spaced apart by about 12 hours.

It is expected that electrical therapy signals having parameters in the foregoing ranges will provide effective therapy to the patient, without causing paresthesia and/or other potentially undesirable sensory responses in the patient. Accordingly, the electrical therapy signal can be referred to herein as a non-sensory response therapy signal. Undesirable sensory responses include, in addition to or in lieu of paresthesia, a sensation of heat and/or pressure, and/or side effects related to the patient's hearing faculties. In particular, the frequency of the signal can be deliberately selected to be above the patient's upper hearing threshold. While it is not believed that the therapy signal generates sound waves, it can nevertheless trigger an auditory response, e.g., a sensation of "ringing," possibly through mechanical, bone, and/or far-field electrical conduction, and/or interactions with native mechanical acoustic damping systems, e.g., the tensor tympani muscle. The typical upper hearing threshold for a patient is at or below 15 kHz and accordingly, a signal having a frequency in the range of about 15 kHz to about 50 kHz can provide paresthesia-free stimulation, without triggering auditory effects, in at least some embodiments. Because the upper threshold differs from patient to patient, the signal frequency can be selected on a patient-by-patient basis. For example, patients having a reduced upper threshold (e.g., older patients) can potentially receive a beneficial effect from stimulation toward the lower end of the above frequency range, or even below the above frequency range. The patient's upper auditory threshold can change over time. By customizing the frequency to an individual patient, a wider range of frequencies are available to the practitioner. In addition, lower frequencies can consume less power, which can in turn allow the device applying the stimulation to be smaller, and/or to undergo fewer recharging cycles.

As discussed above, the electrodes applying the stimulation are positioned to target the auricular branches of the patient's vagal nerve. It is expected that, by targeting the auricular branches, the effect of the signals will be limited to an afferent effect (e.g., affecting the brain) and not an efferent effect (e.g., affecting other peripheral nerves). An advantage of this arrangement is that the likelihood for inducing unwanted side effects is limited, and instead, the stimulation is focused on producing an effect on the patient's brain to provide a therapeutic result.

5.0 Representative Indications and Effects

Embodiments of the present technology are suitable for preventing and/or treating a variety of patient indications. Representative indications include: (1) autoimmune and/or inflammatory indications (e.g., arthritis, rheumatoid arthritis, fibromyalgia, irritable bowel syndrome, Crohn's disease, asthma, psoriasis, psoriatic arthritis, multiple sclerosis, Sjogren's Syndrome, autoimmune nephropathy (e.g. Berger's IgA), sepsis, and lupus); (2) neurological indications (e.g., depression, post-partum depression, Alzheimer's disease, headache disorders (e.g., migraine, headaches, cluster headaches), epilepsy, anxiety, and mood disorders); (3) sleep-related indications (e.g., insomnia, failure to achieve deep sleep, REM sleep behavior disorder, and parasomnia; (4) functional enhancement (e.g., memory enhancement, associative learning); and/or (5) pulmonary dysfunctions (asthma, allergic rhinitis, allergic bronchitis, exercise induced bronchoconstriction, chronic obstructive pulmonary disease).

In some embodiments, the present technology is used to improve wellness. Wellness can include any aspect of a person's physical or mental state that has a beneficial effect on the person's overall health and well-being, regardless of whether the person has a particular disease, disorder, or condition. For example, the embodiments described herein can be used to enhance a person's wellness by improving one or more of the following: sleep quality (e.g., increased sleep duration; improved sleep patterns; reduced amount of time to fall asleep, sleep interruptions, snoring, and/or sleep apnea), activity levels (e.g., increased amount, duration, and/or frequency of physical activity), mobility (e.g., improvements in strength, endurance, flexibility, and/or health of joints, muscles, and/or bones), mood (e.g., increased happiness, positivity, calmness, mindfulness, resilience), stress response (e.g., improved reactions to stressful situations; reduced anxiety, cortisol production), and/or cognitive performance (e.g., improved memory, learning, attention, information processing, decision making).

In some embodiments, improvements in one aspect of wellness via the stimulation techniques described herein can also indirectly produce improvements in other aspects of wellness. For example, improvements in a person's sleep quality can lead to improvements in cognitive performance, memory, and/or mood; improvements in a person's mobility can lead to improvements in activity levels; and so on. In some embodiments, stimulation is used to improve a person's wellness independently of treating any particular disease, disorder, or condition of the person (e.g., the person does not have a particular indication and/or the stimulation is not intended to treat a particular indication). In other embodiments, the present technology is used to improve wellness in combination with treatment for a disease, disorder, or condition.

Without bound by theory, it is believed that the efficacy of the presently disclosed therapeutic technique can be correlated with changes in the brain's functioning. In particular, it is expected that networking and/or connectivity between areas of the brain will improve or revert to normal as a result of the therapy. Representative affected areas of the brain can include the insular cortex, the cingulate, the hypothalamus, subsets of the thalamic nuclear complex, the amygdala complex, bed nucleus of the stria terminalis, medial temporal lobe (hippocampus, parahippocampal gyrus and entorhinal cortex), elements of the basal ganglia (putamen, globus pallidus, caudate nucleus) and/or the prefrontal and/or orbital frontal cortex. Such results can be demonstrated by functional magnetic resonance imaging (fMRI) and/or suitable techniques. It is further believed that the electrical therapy signal can reduce at least one pro-inflammatory marker and/or increase at least one anti-inflammatory biomarker. Representative pro-inflammatory biomarkers include IL-1, IL-6, IL-12, IL-17, IL-18, C-reactive protein, TNF-α, and INF-γ. Representative anti-inflammatory biomarkers include IL-4, IL-10, IL-13, IFN-α, and TGF-β. The biomarkers can be assessed as part of the patient screening process, and/or at any point during the therapy regimen.

As discussed above, one feature of embodiments of the current technology is that the electrical therapy signal does not generate paresthesia in the patient. Paresthesia can contaminate the benefits of neurostimulation by causing competing brain signals that detract from the desired therapeutic effects. This can occur in part because paresthesia introduces confounding information in neuroimaging analysis such as functional magnetic resonance imaging and electroencephalography. Paresthesia-inducing stimulation modulates somatosensory neural circuits instead of solely targeting vagal neural circuits, which limits the interpretation of neuroimaging results. For example, modulation of the insula (a cortical region) is commonly cited as biomarker for vagus nerve stimulation efficacy. However, the insula is also implicated in pain/noxious stimulus processing and can be modulated via somatosensory pathways. Accordingly, paresthesia-inducing stimulation can have a contaminating and/or contra-indicated impact. As a result, eliminating paresthesia from the treatment regimen can improve not only patient comfort and willingness to engage in the therapy, but also the ability of the practitioner to assess the efficacy of the therapy and make adjustment.

6.0 Representative Pharmacological/Biological Supplements

In at least some embodiments of the present technology, the foregoing electrical therapy signal can be provided as part of an overall treatment regimen that also includes administering a supplement, e.g., a pharmacological/biological substance, to the patient. As used herein, the term supplement includes pharmacological/biological supplements, e.g., chemical (small molecule and/or other) and/or biological entities, including recombinant supplements and/or genetic molecules, and/or supplements derived from humans and/or (other) animals. It is expected that the pharmacological/biological supplement will increase the efficacy and/or duration of the electrical therapy, and/or that the electrical therapy can improve on the results obtained via a pharmacological treatment. For example, the electrical therapy signal can improve the therapeutic "window" for medication, which corresponds to the difference between efficacy and toxicity. Some of these pharmacological/biological drugs have severe dose-depending effects and it is expected that the electrical therapy can reduce the amount of drug needed by the patient and in effect limit the side effects. In a representative example, the treatment regimen can include administering an effective amount of a pharmaceutical selected from, but not limited to, the following groups csDMARD (conventional synthetic disease modifying antirheumatic arthritis drug) group including, but not limited to, methotrexate, sulfasalazine, leflunomide, hydroxychloroquine, gold salts;

bDMARD (biological disease modifying antirheumatic arthritis drug) group including, but not limited to, abatacept, adalimumab, anakinra, etanercept, golimumab, infliximab, rituximab and tocilizumab;

tsDMARD (targeted synthetic disease modifying antirheumatic arthritis drug) group including, but not limited to, tofacitinib, baricitinib, filgotinib, peficitinib, decernotinib and upadacitinib; and/or CGRP (calcitonin gene-related peptide) inhibitor drug group including, but not limited to, erenumab, fremanezumab, galcanezumab and Eptinezumab.

Agents useful in the treatment of asthma include inhaled corticosteroids, leukotriene modifiers, long-acting beta agonists (LABAS), theophylline, short-acting beta agonists such as albuterol, ipratropium (Atrovent®), intravenous corticosteroids (for serious asthma attacks), allergy shots (immunotherapy), and omalizumab (Xolair®).

7.0 Further Embodiments

From the foregoing, it will be appreciated that specific embodiments of the disclosed technology have been described herein for purposes of illustration, but that various modifications can be made without deviating from the technology. For example, embodiments of the earpieces described above include pairs of electrodes that deliver bipolar signals. In other embodiments, an individual earpiece can include a single, monopolar electrode, with a return electrode positioned remotely from the earpiece, or the earpiece can include more than two electrodes. The neckpiece can have configurations other than those specifically shown in the foregoing Figures. The amplitude at which the electrical therapy signal is delivered can be provided in the form of a step function that remains constant throughout the duration of the therapy, in some embodiments. In other embodiments, the amplitude of the signal can be ramped up gradually (e.g., over multiple incremental steps), for example, if the patient experiences sensory side effects, such as discomfort, when the amplitude is increased in a single step.

In some embodiments, elements of the system can be manufactured in the form that includes a pre-molded, uncured material that is positioned on and/or at least partially within the recipient's ear, where it conforms to the patient's specific physiology, and is then cured to retain the conformed shape. Suitable system elements or components include any of those described above that contact the recipient (e.g., the recipient's concha) in ways that may vary from one patient to the next. Suitable materials include, but are not limited to, UV curable resins, heat cure resins and/or UV cure silicone rubbers. Suitable curing techniques include, but are not limited to, exposure to UV and/or exposure to heat.

In addition to systems and methods for using and manufacturing such systems, the present technology includes methods for programming the systems for use. For example, as discussed above, a physician or other practitioner (e.g., a company representative), can program some or all of the signal delivery parameters into the signal generator. As was also discussed above, the patient can have the ability to modify at least some of the parameters, for example, via the external controller.

As discussed above, the communication pathways between the earpiece and the signal generator, and between the signal generator and the external controller can be in two directions. Accordingly, the signal generator can receive information from the earpieces and/or other elements of the system and take actions based on that information. In one representative example, the earpiece can include a proximity sensor that indicates if the earpiece becomes dislodged or mispositioned during a treatment session. The system can further include a small speaker or other feedback element that indicates to the patient that the position of the earpiece should be adjusted. In another representative example, the external controller can track attributes of each treatment session, for example, the number of treatment sessions, the duration of the treatment sessions, the time of day of the treatment sessions and/or other data relevant to correlating the patient's response with the attributes of the treatment sessions. The system can include a wearable signal generator, e.g., in the form of a neckpiece or integrated with the earpieces (as described above), or in the form of a headband or other wearable. In a further example, the earpiece(s) can include speakers to provide music and/or other audio input to the user (e.g., via the external controller).

More generally, the system can include at least one sensor capable of sensing a body signal. The sensor can be selected from, without limitation, a cardiac sensor, a blood oxygenation sensor, a cardiorespiratory sensor, a respiratory sensor, and a temperature sensor. In one embodiment, the electrodes themselves can operate as sensors to detect proximity to the patient's skin, and/or impedance. One or more processors of the system determine a body parameter based on the body signal. For example, the processor can calculate a heart rate, heart rate variability, parasympathetic tone, sympathetic tone, or sympathetic-parasympathetic balance from a cardiac signal; a pulse oximetry value from a blood oxygenation signal; a breathing rate or end tidal volume from a respiratory signal; and/or a sleep and/or exertional level from an accelerometer, gyroscope and/or GPS device coupled to the patient's body. The system can then use the body parameter to adjust one or more parameters in accordance with which the electrical signal is delivered (or not delivered). For example, the signal can be turned off if the patient's heart rate falls below a predetermined lower limit, or if activity levels become elevated or depressed. In a representative embodiment, the sensor is located on the skin of a lateral surface of the ear (i.e., the side of the ear facing toward the patient). In another embodiment, the sensor is externally located on the skin of the patient's head below the mastoid. In still further embodiments, the sensor can be positioned at a different location, and can be carried by the earpiece(s), the neckpiece, and/or another portion of the system.

The electrical therapy signal can be applied to just a single ear, or to both ears. When therapy is applied to both ears, the signal can be the same for both, or at least one signal delivery parameter can differ for a signal applied to the right ear, as compared to a signal applied to the left ear. The signal(s) can be applied simultaneously or sequentially to each ear. In some embodiments, by using one or both ears, the system can exploit the known difference in left versus right vagus nerves as principally an inflow or outflow system of the NTS (nucleus tractus solitarius), respectively. Afferent fibers, accessible in the tragal somatic representation of the vagus as well as sympathetic afferent neural inflows, will potentially enable the therapy signals in accordance with the present technology to impact visceral sensory signal integration at higher CNS (central nervous system) structures, including the NTS, RVLN (rostroventrolateral reticular nucleus), trigeminal nucleus, locus cerelous, parabrachial nucleus, hypothalamus, subsets of the thalamus, and/or cortical structures related to autonomic functioning and/or the dorsal motor nucleus.

The therapy signal can include waveforms other than that shown in FIG. 9, e.g., a triangular waveform or a sinusoidal waveform. The therapy signal can be applied continuously (e.g., a 100% duty cycle), or in accordance with a lower duty cycle, e.g., a 50% duty cycle or other duty cycle. The signal can vary, as described above. For example, the signal can vary in an irregular, non-periodic manner, e.g., with bi-phasic pulses having a total duration of 50 us repeated randomly at from one microsecond to 100 microsecond intervals. In another embodiment, the irregular waveform can be characterized by the average number of zero crossing (as defined by a change in polarity) of the signal. For example, the average number of zero crossings for any given second of the stimulation signal is 40,000 for a 20 kHz signal with bi-phasic rectangular pulses. The signal can also be applied either simultaneously or alternatingly to other peripheral nerves to further enhance the therapeutic effect.

As discussed above, the patient and/or practitioner can modify therapeutic doses of stimulation through a software application (an "app") for a mobile electronic device (such as an iPhone or an Android-based mobile device) based on clinician guidelines and patients' adherence to the app. In other embodiments, the system can include verbal response options to provide patients with verbal statements about the status of the therapy, feedback, and/or instructions; the ability to modulate the maximum amplitude (and/or other parameters) of the therapy for the user based on conditioning and/or other sensor responses; monitoring the count of the therapy doses by the app (and/or system hardware); and/or enable the patient to purchase a therapy session using the app or a companion device; enable clinicians to monitor the patients' conditions and responses to therapy over the internet; and/or allowing clinicians to change the parameters of the therapy via internet-enabled communications.

Representative targets for the electrical therapy signal, in addition to or lieu of the concha, include the antihelix, tragus, antitragus, helix, scapha, triangular fossa, lobule, and/or a lateral surface of the ear (i.e., the side of the ear facing the patient), although it is expected that stimulation provided to the concha will produce superior results.

As described above, some techniques in accordance with the present technology include coordinating the delivery of the therapy signal with the patient's respiratory cycles. Accordingly, the system can include a respiratory sensor that monitors the patient's respiratory exhalation and (a) activates the stimulator approximately at the start of each exhalation phase and (b) deactivates the stimulator approximately at the end of the each exhalation phase. The respiratory sensor can use motion or acoustic monitoring technology to identify the start and end of each exhalation phase. The respiratory sensor can be integrated in a chest or stomach belt, or integrated into a face mask. Further, the respiratory sensor can have a band-aid-type form factor, and can placed on the patient's neck. In another configuration, the respiratory sensor can include an optical sensor, such as a photoplethysmogram (PPG) sensor that is integrated with the earpiece.

As discussed above, the disclosed electrical therapy can be applied alone or in combination with a pharmacological/biologic treatment. In other embodiments, the therapy can be combined with still further therapy types (e.g., electrical stimulation at another location of the body) in addition to or in lieu of a combination with pharmacological/biologic treatments.

Elements of the present disclosure described under a particular Heading can be combined with elements described under other Headings in any of a variety of suitable manners. To the extent any materials disclosed herein by reference conflict with the present disclosure, the present disclosure controls.

EXAMPLES

The following examples provide further representative embodiments of the present technology.

1. A device for delivering an electrical signal to a subject, the device comprising:
a signal delivery element including at least two electrodes configured to deliver the electrical signal to a first portion of the subject's ear;
a retention element configured to engage a second portion of the subject's ear; and
an adjustment mechanism permitting movement of the signal delivery element relative to the retention element to place the at least two electrodes in contact with the first portion of the subject's ear.

2. The device of example 1, further comprising:
a first arm member;
a second arm member; and
a joint pivotally coupling the first arm member and the second arm member to one another,
wherein—
the signal delivery element is coupled to the first arm member, and
the retention element is coupled to the second arm member.

3. The device of example 2 wherein the second arm member includes an aperture and wherein the first arm member is received within the aperture of the second arm member.

4. The device of example 2 or example 3, further comprising a linkage member configured to rotatably couple the signal delivery element to the first arm member, wherein the signal delivery element is rotatably coupled to the linkage member by a second pivot joint, wherein the second pivot joint is configured to permit rotation of the signal delivery element relative to the linkage member about a first axis of rotation, and wherein the linkage member is configured to permit rotation of the linkage member and the signal delivery element relative to the first arm member about a second axis of rotation non-parallel to the first axis of rotation.

5. The device of any of examples 1-4 wherein the at least two electrodes include a first electrode positioned on a first end of the signal delivery element and a second electrode positioned on a second end of the signal delivery element, the second end opposite the first end.

6. The device of any of examples 1-5, further comprising a feedback device configured to provide a feedback signal to the subject.

7. The device of example 6 wherein the feedback device includes a speaker and the feedback signal includes an audio signal.

8. The device of any of examples 1-7 wherein the signal delivery element includes a first magnetic element, wherein the retention element includes a second magnetic element, and wherein a magnetic attraction between the first magnetic element and the second magnetic element is configured to hold the at least two electrodes in position to deliver the electrical signal to the first portion of the subject's ear.

9. A device for delivering an electrical signal to a subject's ear, the device comprising:
a signal delivery element including at least two transcutaneous electrodes configured to deliver the electrical signal to a cymba concha of the subject's ear;
an earbud configured to engage an ear canal of the subject's ear; and
a spring mechanism connecting the signal delivery element to the earbud, wherein the spring mechanism is configured to bias the signal delivery element to a position in which the at least two transcutaneous electrodes are placed in contact with the cymba concha.

10. The device of example 9 wherein the spring mechanism includes:
a first arm member;
a second arm member; and
a joint pivotally coupling the first arm member and the second arm member to one another,
wherein—
the signal delivery element is coupled to the first arm member,
the earbud is coupled to the second arm member, and
the spring mechanism is configured to bias the first arm member and the second arm member toward one another to bias the signal delivery element toward the position in which the at least two transcutaneous electrodes are placed in contact with the cymba concha.

11. The device of example 9 or example 10 wherein the earbud is rotatably coupled to the spring mechanism by an earbud joint configured to permit rotation of the earbud relative to the signal delivery element.

12. The device of example 11 wherein the spring mechanism is configured to permit rotation of the signal delivery element and the earbud relative to one another about a first axis of rotation, and wherein the joint is configured to permit rotation of the earbud about a second axis of rotation different than the first axis of rotation.

13. The device of any of examples 9-12 further comprising a plurality of pivot joints arranged in series between the signal delivery element and the earbud, wherein individual ones of the plurality of pivot joints include an axis of rotation and are configured to permit movement of the signal delivery element and the earbud relative to one another about the axis of rotation.

14. The device of example 13 wherein the axis of rotation of any one of the plurality of pivot joints is non-parallel to the axis of rotation one or both immediately adjacent pivot joints.

15. A device for delivering an electrical signal to a subject's ear, the device comprising:
a signal delivery element including a first magnetic element and at least two electrodes configured to deliver the electrical signal to a cymba concha of the subject's ear;
an earpiece body configured to engage a posterior portion of the subject's ear, the earpiece body including a second magnetic element; and a flexible member connecting the signal delivery element to the earpiece body, wherein the flexible member permits movement of the signal delivery element to place the at least two electrodes in contact with the cymba concha.

16. The device of example 15 wherein a magnetic attraction between the first magnetic element and the second magnetic element is configured to hold the at least two electrodes in position to deliver the electrical signal to the cymba concha of the subject's ear.

17. The device of example 15 or example 16 wherein the first magnetic element is configured to rotate relative to the signal delivery element to align the first magnetic element with the second magnetic element.

18. The device of any of examples 15-17 wherein the flexible member extends perpendicularly from the earpiece body.

19. The device of any of examples 15-18 wherein a magnetic attraction between the first magnetic element and the second magnetic element is configured to at least partially prevent movement of the signal delivery element and the earpiece body relative to one another.

20. The device of any of examples 15-19 wherein the earpiece body includes:
a hook member extending anteriorly relative to the flexible member and configured to secure the earpiece body to an upper portion of the subject's ear; and
a tail member extending downwardly relative to the flexible member and configured to contour along a posterior surface of the subject's ear.

We claim:

1. A device for delivering an electrical signal to a subject, the device comprising:
a signal delivery element including at least two electrodes configured to deliver the electrical signal to a first portion of the subject's ear;
a retention element configured to engage a second portion of the subject's ear;
an adjustment mechanism permitting movement of the signal delivery element relative to the retention element to place the at least two electrodes in contact with the first portion of the subject's ear, wherein the adjustment mechanism comprising a first arm member; and
a linkage member configured to rotatably couple the signal delivery element to the first arm member, wherein the signal delivery element is rotatably coupled to the linkage member by a second pivot joint.

2. The device of claim 1, wherein the adjustment mechanism further comprising:
a second arm member; and
a joint pivotally coupling the first arm member and the second arm member to one another, wherein—
the signal delivery element is coupled to the first arm member, and
the retention element is coupled to the second arm member.

3. The device of claim 2, wherein the second arm member includes an aperture and wherein at least part of the first arm member is positioned within the aperture of the second arm member.

4. The device of claim 2, wherein the second pivot joint is configured to permit rotation of the signal delivery element relative to the linkage member about a first axis of rotation, and wherein the linkage member is configured to permit rotation of the signal delivery element relative to the first arm member about a second axis of rotation non-parallel to the first axis of rotation.

5. The device of claim 1, wherein the at least two electrodes include a first electrode positioned on a first end of the signal delivery element and a second electrode positioned on a second end of the signal delivery element, the second end opposite the first end.

6. The device of claim 1, further comprising a feedback device configured to provide a feedback signal to the subject.

7. The device of claim 6, wherein the feedback device includes a speaker, and the feedback signal includes an audio signal.

8. The device of claim 1, wherein the signal delivery element includes a first magnetic element, wherein the retention element includes a second magnetic element, and wherein a magnetic interaction between the first magnetic element and the second magnetic element is configured to hold the at least two electrodes in position to deliver the electrical signal to the first portion of the subject's ear.

9. A device for delivering an electrical signal to a subject's ear, the device comprising:
a signal delivery element including at least two transcutaneous electrodes configured to deliver the electrical signal to a cymba concha of the subject's ear;
an earbud configured to engage an ear canal of the subject's ear; and
a spring mechanism connecting the signal delivery element to the earbud, wherein the spring mechanism is configured to bias the signal delivery element to a position in which the at least two transcutaneous electrodes are placed in contact with the cymba concha, wherein the earbud is rotatably coupled to the spring mechanism by an earbud joint configured to permit rotation of the earbud relative to the signal delivery element.

10. The device of claim 9, wherein the spring mechanism includes:
a first arm member;
a second arm member; and
a joint pivotally coupling the first arm member and the second arm member to one another, wherein—
the signal delivery element is coupled to the first arm member,
the earbud is coupled to the second arm member, and
the spring mechanism is configured to bias the first arm member and the second arm member toward one another about the joint to bias the signal delivery element toward the position in which the at least two transcutaneous electrodes are placed in contact with the cymba concha.

11. The device of claim 9, wherein the spring mechanism is configured to permit rotation of the signal delivery element and the earbud relative to one another about a first axis of rotation, and wherein the joint is configured to permit rotation of the earbud about a second axis of rotation different than the first axis of rotation.

12. The device of claim 9, further comprising a plurality of pivot joints arranged in series between the signal delivery element and the earbud, wherein individual ones of the plurality of pivot joints include an axis of rotation and are configured to permit movement of the signal delivery element and the earbud relative to one another about the axis of rotation.

13. The device of claim 12, wherein the axis of rotation of any one of the plurality of pivot joints is non-parallel to the axis of rotation of at least one immediately adjacent pivot joint.

14. A device for delivering an electrical signal to a subject's ear, the device comprising:
- a signal delivery element including a first magnetic element and at least two electrodes configured to deliver the electrical signal to a cymba concha of the subject's ear;
- an earpiece body configured to engage a posterior portion of the subject's ear, the earpiece body including a second magnetic element, wherein the first magnetic element is configured to rotate relative to the signal delivery element to align the first magnetic element with the second magnetic element; and
- a flexible member connecting the signal delivery element to the earpiece body, wherein the flexible member permits movement of the signal delivery element to place the at least two electrodes in contact with the cymba concha.

15. The device of claim 14, wherein an interaction between the first magnetic element and the second magnetic element is configured to hold the at least two electrodes in position to deliver the electrical signal to the cymba concha of the subject's ear.

16. The device of claim 14, wherein the flexible member extends perpendicularly from the earpiece body.

17. The device of claim 14, wherein a magnetic attraction between the first magnetic element and the second magnetic element is configured to at least partially prevent movement of the signal delivery element and the earpiece body relative to one another.

18. The device of claim 14, wherein the earpiece body includes:
- a hook member extending anteriorly relative to the flexible member and configured to secure the earpiece body to an upper portion of the subject's ear; and
- a tail member extending downwardly relative to the flexible member and configured to contact a posterior surface of the subject's ear.

* * * * *